United States Patent
Tong et al.

(10) Patent No.: US 10,768,378 B2
(45) Date of Patent: Sep. 8, 2020

(54) FIBER ALIGNMENT DEVICE, FERRULE DEVICE AND METHOD OF MANUFACTURING THE FERRULE DEVICE

(71) Applicant: CommScope Telecommunications (Shanghai) Co. Ltd., Shanghai (CN)

(72) Inventors: Zhaoyang Tong, Shanghai (CN); Lin Lin, Shanghai (CN); Lei Liu, Shanghai (CN)

(73) Assignee: CommScope Telecommunications (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 15/323,498

(22) PCT Filed: Jul. 1, 2015

(86) PCT No.: PCT/IB2015/054955
§ 371 (c)(1),
(2) Date: Jan. 3, 2017

(87) PCT Pub. No.: WO2016/001854
PCT Pub. Date: Jan. 7, 2016

(65) Prior Publication Data
US 2017/0139151 A1   May 18, 2017

(30) Foreign Application Priority Data
Jul. 1, 2014 (CN) .......................... 2014 1 0309266

(51) Int. Cl.
  *G02B 6/38* (2006.01)
  *G02B 6/36* (2006.01)
(52) U.S. Cl.
  CPC ......... *G02B 6/3843* (2013.01); *G02B 6/3838* (2013.01); *G02B 6/3861* (2013.01); *G02B 6/3874* (2013.01)

(58) Field of Classification Search
  CPC .. G02B 6/3825; G02B 6/3882; G02B 6/3874; G02B 6/3861; G02B 6/3843;
  (Continued)

(56) References Cited

U.S. PATENT DOCUMENTS 4,215,937 A * 8/1980 Borsuk ................ G02B 6/3843
                                                     356/400
4,330,171 A    5/1982 Malsot et al.
(Continued)

FOREIGN PATENT DOCUMENTS

CN         86104201 A     4/1987
CN          1526081 A     9/2004
(Continued)

OTHER PUBLICATIONS

International Search Report and Written Opinion of the International Searching Authority for International Patent Application No. PCT/IB2015/054955 dated Oct. 2, 2015, 9 pgs.
(Continued)

*Primary Examiner* — Kaveh C Kianni
*Assistant Examiner* — Hung Q Lam
(74) *Attorney, Agent, or Firm* — Merchant & Gould P.C.

(57) ABSTRACT

A fiber alignment device includes: a fixation block; an alignment element having a first end portion fixed in the fixation block and a second end portion formed with a protrudent platform, an alignment groove being formed in the alignment element and extending to an end of the protrudent platform in a central axis of the alignment element; an alignment sleeve having a first end portion fitted on the second end portion of the alignment element; and a spring element having a first end extending into the alignment sleeve and pressed against the alignment groove in the protrudent platform. The front end of the ferrule assembly is inserted into the alignment sleeve and when the fiber is
(Continued)

inserted into the alignment groove of the alignment element, the position accuracy of the fiber in the fiber bore of the ferrule assembly is calibrated to reach position accuracy of the fiber in the alignment groove of the alignment element. A high precision fiber optic connector may be manufactured with a low precision ferrule. The spring element is pressed against the fiber inserted into the alignment groove, so that an eccentricity orientation of a center of the fiber with respect to a center of the alignment element is adjusted to a predetermined orientation and held in the predetermined orientation. Thereby, it may eliminate a process of identifying and adjusting the eccentricity orientation of the center of the fiber.

21 Claims, 27 Drawing Sheets

(58) Field of Classification Search
CPC .. G02B 6/3846; G02B 6/3851; G02B 6/3898; G02B 6/3881; G02B 6/3834; G02B 6/3835; G02B 6/3858; G02B 6/3838
USPC ............... 385/60, 62, 65, 67, 78, 81, 83, 87
See application file for complete search history.

(56) References Cited

U.S. PATENT DOCUMENTS

| | | | |
|---|---|---|---|
| 4,351,586 A | 9/1982 | Phillips et al. | |
| 4,482,201 A | 11/1984 | Dousset | |
| 4,738,508 A | 4/1988 | Palmquist | |
| 4,830,456 A | 5/1989 | Kakki et al. | |
| 5,206,921 A | 4/1993 | Okada et al. | |
| 5,339,376 A * | 8/1994 | Kakii .................... | G02B 6/3839 385/59 |
| 5,664,039 A | 9/1997 | Grinderslev et al. | |
| 5,993,070 A * | 11/1999 | Tamekuni ............ | G02B 6/3846 385/137 |
| 6,086,704 A | 7/2000 | Kanai et al. | |
| 6,634,800 B2 | 10/2003 | Suematsu et al. | |
| 6,726,370 B2 | 4/2004 | Shimotsu | |
| 6,742,936 B1 | 6/2004 | Knecht | |
| RE43,542 E * | 7/2012 | Murray ................ | G02B 6/3846 385/80 |
| 9,563,027 B2 | 2/2017 | Childers et al. | |
| 2002/0118928 A1 | 8/2002 | Roehrs et al. | |
| 2002/0172490 A1 | 11/2002 | Bonja | |
| 2008/0181563 A1 * | 7/2008 | Akiyama ............. | G02B 6/2558 385/96 |
| 2017/0139154 A1 | 5/2017 | Tong et al. | |
| 2017/0160492 A1 | 6/2017 | Lin et al. | |

FOREIGN PATENT DOCUMENTS

| | | |
|---|---|---|
| CN | 201464676 U | 5/2010 |
| CN | 203299417 U | 11/2013 |
| CN | 203299418 U | 11/2013 |
| CN | 104181644 A | 12/2014 |
| CN | 104181645 A | 12/2014 |
| EP | 0 205 984 A1 | 12/1986 |
| GB | 2 215 082 A | 9/1989 |
| JP | S58-108507 A | 6/1983 |
| JP | S58-152214 A | 9/1983 |
| JP | S64-17010 A | 1/1989 |
| JP | H01-96608 A | 4/1989 |
| JP | H06-34845 A | 2/1994 |
| JP | H10-160970 A | 6/1998 |
| JP | 2001-249249 A | 9/2001 |
| JP | 2002-023018 A | 1/2002 |
| JP | 2002-040294 A | 2/2002 |
| JP | 2008-046433 A | 2/2008 |
| JP | 2012-185283 A | 9/2012 |
| WO | 2010/068890 A1 | 6/2010 |
| WO | 2013/029157 A1 | 3/2013 |
| WO | 2015068103 A1 | 5/2015 |
| WO | 2016/001818 A1 | 1/2016 |
| WO | 2016/001819 A1 | 1/2016 |
| WO | 2016/001857 A1 | 1/2016 |

OTHER PUBLICATIONS

Chinese Office Action for Chinese Patent Application No. 201410309266.4 dated Jun. 29, 2016, 9 pgs.

* cited by examiner

FIBER ALIGNMENT DEVICE, FERRULE DEVICE AND METHOD OF MANUFACTURING THE FERRULE DEVICE

CROSS-REFERENCE TO RELATED APPLICATION

This application is a National Stage of PCT/IB2015/054955, filed Jul. 1, 2015, which claims the benefit of Chinese Patent Application No. 201410309266.4 filed on Jul. 1, 2014 in the State Intellectual Property Office of China the disclosures of which are incorporated herein by reference in their entireties. To the extent appropriate a claim of priority is made to each of the above disclosed applications.

BACKGROUND OF THE INVENTION

Field of the Invention

The present invention relates to a ferrule assembly, a fiber alignment device, a ferrule device and a method of manufacturing the ferrule device.

Description of the Related Art

FIG. 1a is an illustrative view of a single-fiber ferrule assembly (ferrule device) 10 of a fiber optic connector in the prior art; and FIG. 1b is a cross section view of the single-fiber ferrule assembly 10 shown in FIG. 1a.

As shown in FIG. 1a and FIG. 1b, in the prior art, during manufacturing the single-fiber optic connector, the ferrule assembly 10 comprising a ferrule 12 and a rear seat 11 connected to a rear end of the ferrule 12 is usually used. The rear seat 11 may be a plastic member formed on the rear end of the ferrule 12 by molding, or may be a metal member fixed on the rear end of the ferrule 12 by crimping.

As shown in FIG. 1a and FIG. 1b, a hollow chamber 14, for receiving an adhesive, is formed in the rear seat 11. An axial front port of the hollow chamber 14 is coaxial and communicated with a fiber bore 15 in the ferrule 12. During manufacturing the fiber optic connector, an enough adhesive is firstly injected into the hollow chamber 14 through an axial rear port (adhesive injection port) 13 by means of an adhesive injection needle (not shown), then a bared and cleaned fiber of the optical cable is inserted through the hollow chamber 14 and the fiber bore 15, fully filled with adhesive, of the ferrule assembly 10, then the adhesive is cured to fix the fiber in the fiber bore 15 of the ferrule assembly 10, then the ferrule assembly 10 is processed by a series of procedures, such as, grinding, polishing, testing, assembling, etc., and finally, a fiber optic ferrule device (finished ferrule assembly) is obtained.

In the prior art, a manufacturing error is unavoidable during manufacturing the ferrule assembly. Furthermore, a personal error may be occurred in size for easily fitting/assembling the ferrule assembly, for example, in order to easily insert the fiber through the fiber bore of the ferrule, the diameter of the fiber bore of the ferrule is formed to be larger than the outer diameter of the fiber, causing a size deviation between the outer diameter of the fiber and the inner diameter of the fiber bore of the ferrule. Thereby, it is likely to occur various errors in the ferrule assembly, for example, a center axis of the fiber is offset from a center axis of the fiber bore of ferrule due to a large gap between the fiber and the fiber bore of the ferrule, a center position of the fiber bore is offset from an ideal center position of the fiber bore determined with reference to an indexing feature, for example, an outer cylinder of a single-fiber ferrule or a guide hole of a multi-fiber ferrule. As a result, an actual center axis of the fiber in the fiber bore of the ferrule may be offset from an ideal center axis of the fiber determined with reference to the indexing feature of the ferrule due to these errors. The above factors may cause an irregular lateral shift of the center axis of the fiber, increase the insertion loss of mating a pair of fiber optic connectors and decrease the optical transmission performance of the fiber optic connectors.

SUMMARY OF THE INVENTION

The present invention has been made to overcome or alleviate at least one aspect of the above mentioned disadvantages.

In order to compensate defects occurred in manufacturing a fiber optic connector in the prior art, the inventor of the present application filed a Chinese application No. CN201310203120.7 (hereafter referred as D1) and a Chinese application No. CN201310203217.8 (hereafter referred as D2) on May 28, 2013 and a Chinese application No. CN201310226442.3 (hereafter referred as D3) and a Chinese application No. CN201310226188.7 (hereafter referred as D4) on Jun. 7, 2013. In these Chinese applications, there are proposed solutions to produce a fiber optic connector with high precision, low insertion loss and low cost by a low precision ferrule, of which a diameter of a fiber bore is far larger than that of a fiber, and an error of the center of the fiber bore with respect to an ideal center is very large. The whole disclosures of these Chinese applications are incorporated herein by reference.

Based on the Chinese applications D1~D4, the present invention discloses an improved fiber alignment device capable of positioning a fiber in a low precision ferrule with high precision and adjusting an eccentricity orientation of the fiber to a predetermined orientation. Thereby, during mating a pair of fiber optic connectors having the ferrules, it may simply locate the eccentricity orientations of the pair of fiber optic connectors in the same fiber core adjusting region, reducing the insertion loss between the pair of fiber optic connectors after randomly mating the pair of fiber optic connectors.

According to an object of the present invention, there is provided a fiber alignment device capable of positioning a fiber in a low precision ferrule in high precision and adjusting an eccentricity orientation of the fiber to a predetermined orientation.

According to an aspect of the present invention, there is provided a fiber alignment device for calibrating position accuracy of a fiber in a fiber bore of a ferrule assembly, comprising: a fixation block; an alignment element having a first end portion fixed in the fixation block and a second end portion formed with a protrudent platform, an alignment groove being formed in the alignment element and extending to an end of the protrudent platform in a central axis of the alignment element; an alignment sleeve having a first end portion fitted on the second end portion of the alignment element and a second end portion opposite to the first end portion; and a spring element having a first end entering into the alignment sleeve and pressed against the alignment groove in the protrudent platform downward in a direction perpendicular to the central axis of the alignment element. The fiber protrudes from the front end of the ferrule assembly, and the front end of the ferrule assembly is inserted into the alignment sleeve from the second end portion of the alignment sleeve until a predetermined length of the fiber protruding from the front end of the ferrule assembly enters into the alignment groove of the alignment element. When the front end of the ferrule assembly is inserted into the alignment sleeve and when the fiber is inserted into the alignment groove of the alignment element, the position accuracy of the fiber in the fiber bore of the ferrule assembly is calibrated to reach position accuracy of the fiber in the alignment groove of the alignment element. The first end of the spring element is configured to be pressed against the fiber inserted into the alignment groove, so that an eccentricity orientation of a center of the fiber with respect to a center of the alignment element is adjusted to a predetermined orientation and held in the predetermined orientation.

According to an exemplary embodiment of the present invention, the eccentricity orientation of the center of the fiber with respect to the center of the alignment element is adjusted to be just below the center of the alignment element.

According to another exemplary embodiment of the present invention, after the eccentricity orientation of the center of the fiber with respect to the center of the alignment element is adjusted to be just below the center of the alignment element, the fiber is fixed in the though hole of the ferrule assembly by an adhesive.

According to another exemplary embodiment of the present invention, an eccentricity orientation mark is formed on an outer surface of the ferrule assembly to identify the eccentricity orientation of the center of the fiber with respect to the center of the alignment element; or an existing feature on the ferrule assembly is used as an eccentricity orientation mark to identify the eccentricity orientation of the center of the fiber with respect to the center of the alignment element.

According to another exemplary embodiment of the present invention, the eccentricity orientation mark is located on a ferrule or a rear seat of the ferrule assembly.

According to another exemplary embodiment of the present invention, an injection hole, for injecting the adhesive into the ferrule assembly, formed in an external profile surface of the ferrule assembly is used as the eccentricity orientation mark.

According to another exemplary embodiment of the present invention, the spring element is configured to be a cantilever spring piece, and the second end of the spring element is connected to the fixation block by a screw; and a press force exerted on the fiber by the first end of the spring element is adjusted by controlling a distance of screwing the screw into a threaded hole in the fixation block, so as to adapt to different diameters of fibers.

According to another exemplary embodiment of the present invention, a positioning slot is formed in the spring element, and a protruding positioning key is formed on the fixation block; the positioning key is fitted in the positioning slot to position the spring element, so as to keep the position of the spring element in a direction perpendicular to the central axis of the alignment element and the press force unchanged.

According to another exemplary embodiment of the present invention, the spring element comprises a first sheet portion substantially parallel to the central axis of the alignment element and a second sheet portion substantially perpendicular to and intersected to the first sheet portion; and the positioning slot is formed in both the first sheet portion and the second sheet portion.

According to another exemplary embodiment of the present invention, a notch is formed in the alignment sleeve, and the first end of the spring element enters into the alignment sleeve through the notch.

According to an aspect of the present invention, there is provided a method for manufacturing a fiber optic ferrule device, comprising steps of:

providing a ferrule assembly;

inserting a fiber into a fiber bore of the ferrule assembly until the fiber protrudes a predetermined distance from a front end of the ferrule assembly;

injecting an adhesive into the ferrule assembly;

sucking the adhesive from the front end of the ferrule assembly, so that the adhesive flows to a front end surface of the ferrule assembly through a gap between the fiber and the fiber bore until a predetermined sized adhesive bump is formed on the front end surface of the ferrule assembly;

providing the fiber alignment device as mentioned in the above embodiments;

inserting the front end of the ferrule assembly into the alignment sleeve of the fiber alignment device until a predetermined length of the fiber, protruding from the front end of the ferrule assembly, enters into the alignment groove of the alignment element; and curing the adhesive to fix the fiber in the fiber bore of the ferrule assembly.

According to another exemplary embodiment of the present invention, the method further comprises a step of: after the predetermined length of the fiber is inserted into the alignment groove of the alignment element, forming an eccentricity orientation mark on an outer surface of the ferrule assembly or using an existing feature on the ferrule assembly as an eccentricity orientation mark to identify the eccentricity orientation of the center of the fiber with respect to the center of the alignment element.

According to another exemplary embodiment of the present invention, the eccentricity orientation mark is located on a ferrule or a rear seat of the ferrule assembly.

According to another exemplary embodiment of the present invention, an injection hole, for injecting the adhesive into the ferrule assembly, formed in an external profile surface of the ferrule assembly is used as the eccentricity orientation mark.

According to another exemplary embodiment of the present invention, the adhesive is sucked from the front end of the ferrule assembly by a vacuum suction device.

According to another exemplary embodiment of the present invention, the vacuum suction device comprises: a vacuum generator; and a vacuum suction nozzle adapted to be hermetically sucked on the front end of the ferrule assembly and connected to a vacuum suction port of the vacuum generator through a connection pipe.

According to another exemplary embodiment of the present invention, the vacuum suction device further comprises: a pressure regulating valve connected to an inlet port of the vacuum generator, so as to adjust an inlet pressure of the vacuum generator.

According to another exemplary embodiment of the present invention, the vacuum suction device further comprises: a pressure sensor provided on the connection pipe between the vacuum suction nozzle and the vacuum suction port of the vacuum generator, so as to sense a negative pressure value in the connection pipe.

According to another exemplary embodiment of the present invention, the step of sucking the adhesive from the front end of the ferrule assembly comprises: determining whether the vacuum suction nozzle is hermetically sucked on the front end of the ferrule assembly based on the negative pressure value sensed by the pressure sensor.

According to another exemplary embodiment of the present invention, the vacuum suction device further comprises: a vacuum filter provided in the connection pipe between the vacuum suction nozzle and the vacuum suction port of the vacuum generator.

According to another exemplary embodiment of the present invention, the size of the adhesive bump formed on the front end surface of the ferrule assembly is identified by a visual recognition device.

According to another exemplary embodiment of the present invention, the method further comprises: controlling the vacuum generator to generate a failure pressure to release the vacuum suction nozzle from the ferrule assembly once the size of the adhesive bump formed on the front end surface of the ferrule assembly and identified by the visual recognition device reaches the predetermined size.

According to another exemplary embodiment of the present invention, the ferrule assembly, comprises: a ferrule formed with a fiber bore for receiving an optical fiber therein; and a rear seat connected to a rear end of the ferrule, wherein the rear seat is formed with a hollow chamber passing through the rear seat in a longitudinal direction and communicates with the fiber bore of the ferrule, wherein an injection hole for injecting the adhesive into the ferrule assembly is formed in an external profile surface of the ferrule assembly, and directly communicated with the fiber bore of the ferrule or the hollow chamber of the rear seat, and wherein the adhesive is injected into the fiber bore of the ferrule or the hollow chamber of the rear seat through the injection hole.

According to another exemplary embodiment of the present invention, the injection hole is formed in an external profile surface of the ferrule and directly communicated with the fiber bore of the ferrule.

According to another exemplary embodiment of the present invention, the injection hole has an outer opening outside the ferrule and an inner opening inside the ferrule; and the inner opening of the injection hole is configured to be smaller than the outer opening of the injection hole, so as to prevent an adhesive injection needle inserted through the outer opening of the injection hole from entering into the fiber bore of the ferrule.

According to another exemplary embodiment of the present invention, the injection hole has a dimension reducing from outside toward inside of the ferrule in a stepped manner or a tapered manner.

According to another exemplary embodiment of the present invention, the injection hole is formed in an external profile surface of the rear seat and directly communicated with the hollow chamber of the rear seat.

According to another exemplary embodiment of the present invention, the injection hole has an outer opening outside the rear seat and an inner opening inside the rear seat; and the inner opening of the injection hole is configured to be smaller than the outer opening of the injection hole, so as to limit a distance of an adhesive injection needle, inserted through the outer opening of the injection hole, entering into the hollow chamber of the rear seat.

According to another exemplary embodiment of the present invention, the injection hole has a dimension reducing from outside toward inside of the rear seat in a stepped manner or a tapered manner.

According to another exemplary embodiment of the present invention, the injection hole is formed at a joint location of the ferrule and the rear seat and directly communicated with the fiber bore at the rear end of the ferrule.

According to another exemplary embodiment of the present invention, an engagement protrusion is formed inside the rear seat and engaged into a recess in the external profile surface of the ferrule at the rear end of the ferrule.

According to another exemplary embodiment of the present invention, the injection hole is positioned behind the engagement protrusion; or the injection hole is positioned in the engagement protrusion and passes through the engagement protrusion.

According to another exemplary embodiment of the present invention, one or more injection hole is formed in the external profile surface of the ferrule assembly.

According to another exemplary embodiment of the present invention, the injection hole is positioned at any location of the external profile surface of the ferrule assembly.

According to another exemplary embodiment of the present invention, an angle of the injection hole with respect to the fiber bore is set to be any angle larger than zero.

According to another exemplary embodiment of the present invention, the injection hole has a circular, an oval or a rectangular cross section.

According to another exemplary embodiment of the present invention, the fiber bore at the rear end of the ferrule is formed in a horn shaped opening gradually expanded toward the hollow chamber of the rear seat and communicated with the hollow chamber; and the injection hole has an inner opening adjacent to or at the horn shaped opening.

According to another exemplary embodiment of the present invention, the ferrule assembly comprises a single-mode single-fiber ferrule assembly, a single-mode multi-fiber ferrule assembly, a multi-mode single-fiber ferrule assembly, or a multi-mode multi-fiber ferrule assembly.

According to another aspect of the present invention, there is provided a fiber optic ferrule device comprising: a ferrule assembly; and a fiber fixed in a fiber bore of the ferrule assembly, wherein the fiber optic ferrule device is manufactured by the above method.

With the fiber alignment device disclosed in the above exemplary embodiments of the present invention, the position accuracy of the fiber inserted into a fiber bore of a low ferrule assembly may be calibrated, producing a fiber optic connector with high precision and low insertion loss by the low precision ferrule. Generally, a gap between the fiber bore of the low precision ferrule and the inserted fiber may be far larger than a gap between a fiber bore of a high precision ferrule and the inserted fiber. The gap is filled with the adhesive, and the inserted fiber is fixed in the fiber bore by curing the adhesive. In the above exemplary embodiments of the present invention, the end of the fiber protruding from the front end surface of the ferrule is guided into the individual fiber alignment device with high precision, and the position accuracy of the fiber in the fiber bore of the low ferrule assembly is calibrated to reach the position accuracy of the fiber in the high precision fiber alignment device. Also, the center of the fiber is adjustable to regularly shift toward a preset side with respect to an ideal center, for example, by a displacement in an order of submicron or nanometre, and the calibrated and adjusted fiber is fixed in the fiber bore of the low precision ferrule. In this way, the position accuracy of the fiber in the fiber bore of the low ferrule assembly is calibrated to reach the position accuracy of the fiber in the fiber bore of the high precision ferrule, and a fiber optic connector with high precision and low insertion loss may be produced by the low precision ferrule. Furthermore, in the above exemplary embodiments of the present invention, the eccentricity orientation of the fiber is pre-adjusted to the predetermined orientation. Thereby, during mating a pair of fiber optic connectors, it may simply locate the eccentricity orientations of the pair of fiber optic connectors in the same fiber core adjusting region, reducing the insertion loss between the pair of fiber optic connectors after randomly mating the pair of fiber optic connectors.

Furthermore, the fiber optic connector produced by the low precision ferrule by means of the fiber alignment device according to the embodiments of the present invention has good controllability and predictability of the position accuracy of the fiber, good repeatability of the precision from a fiber optic connector to another fiber optic connector. Furthermore, since the eccentricity orientation of the fiber is pre-adjusted to the predetermined orientation, eliminating a process for adjusting the eccentricity orientation of the center of the fiber, (that is, the fiber alignment device according to the embodiments of the present invention achieves the fiber position calibration and the fiber core adjustment of the fiber optic connector, and the process for adjusting the eccentricity orientation of the center of the fiber is not necessary in subsequent processes). In this way, it greatly improves the optical performance and the random mating property (low insertion loss and low random mating loss) of the fiber optic connector.

BRIEF DESCRIPTION OF THE DRAWINGS

The above and other features of the present invention will become more apparent by describing in detail exemplary embodiments thereof with reference to the accompanying drawings, in which:

FIG. 1b is a cross section view of the single-fiber ferrule assembly shown in FIG. 1a;

FIG. 2b is a cross section view of the ferrule assembly shown in FIG. 2a;

FIG. 3b is a cross section view of the ferrule assembly shown in FIG. 3a;

FIG. 4b is a cross section view of the ferrule assembly shown in FIG. 4a;

FIG. 5b is a cross section view of the ferrule assembly shown in FIG. 5a;

FIG. 6b is a cross section view of the ferrule assembly shown in FIG. 6a;

FIG. 7b is a cross section view of the ferrule assembly shown in FIG. 7a;

DETAILED DESCRIPTION OF PREFERRED EMBODIMENTS OF THE INVENTION

Figure 1A:
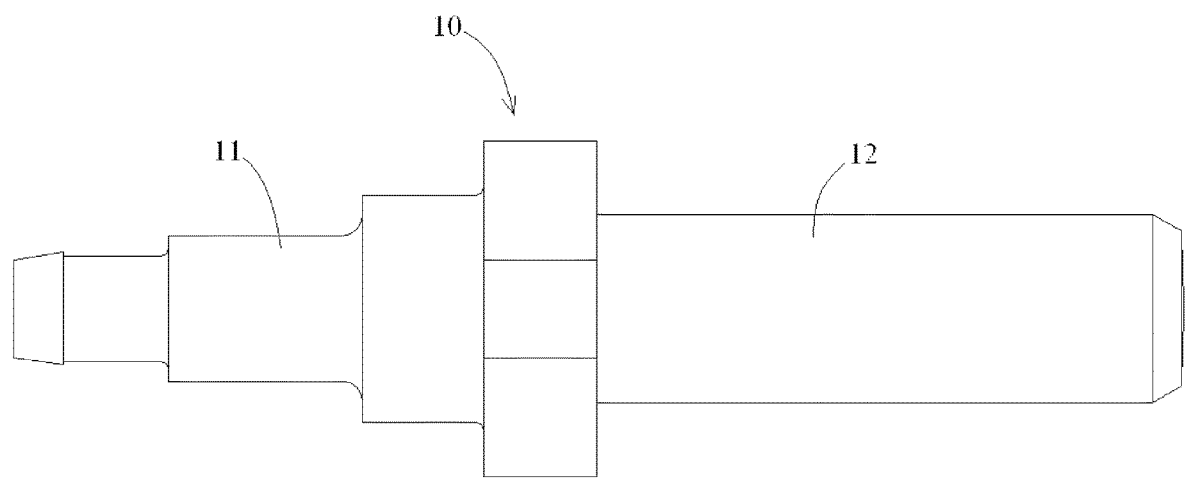
FIG. 1a is an illustrative view of a single-fiber ferrule assembly of a fiber optic connector in the prior art.
Figure 1B:
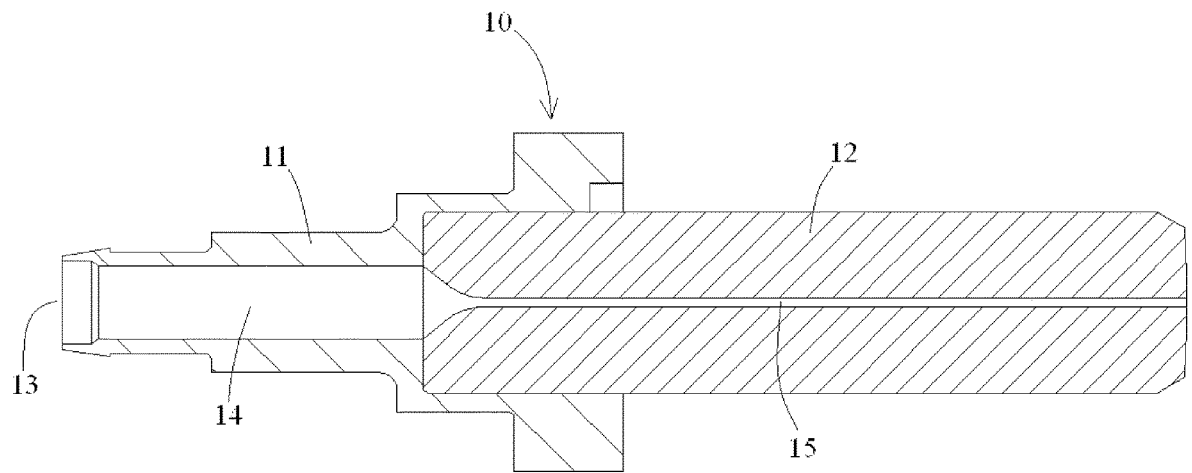

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a ferrule assembly, comprising: a ferrule formed with a fiber bore for receiving an optical fiber; and a rear seat connected to a rear end of the ferrule. The rear seat is formed with a hollow chamber passing through the rear seat in a longitudinal direction and being in communication with the fiber bore of the ferrule. An injection hole for injecting an adhesive into the ferrule assembly is formed in an external profile surface of the ferrule assembly, which is perpendicular to the longitudinal direction of the ferrule assembly, and the injection hole directly is communicated with the fiber bore of the ferrule or the hollow chamber of the rear seat.

Figure 2A:
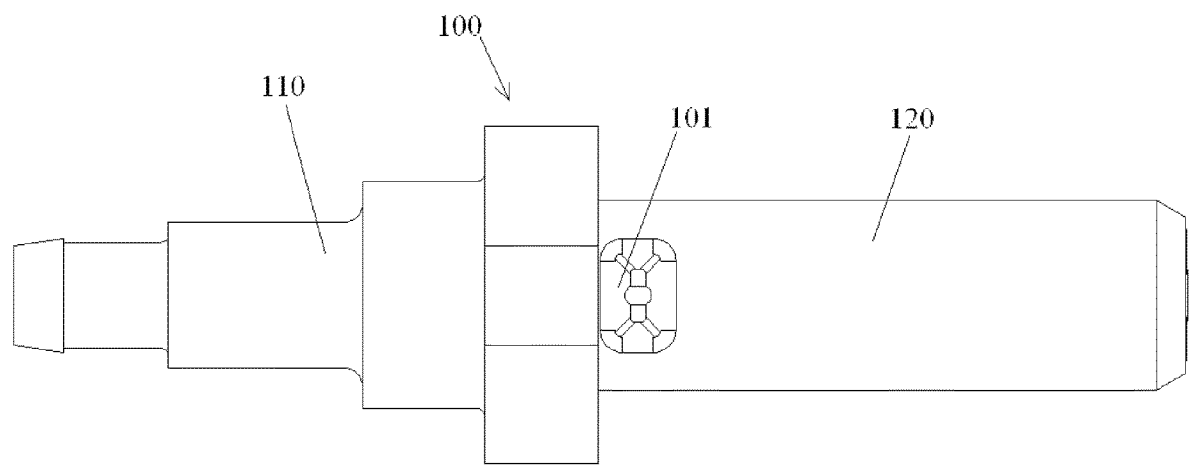
FIG. 2a is an illustrative view of a ferrule assembly of a fiber optic connector according to a first exemplary embodiment of the present invention.
Figure 2B:
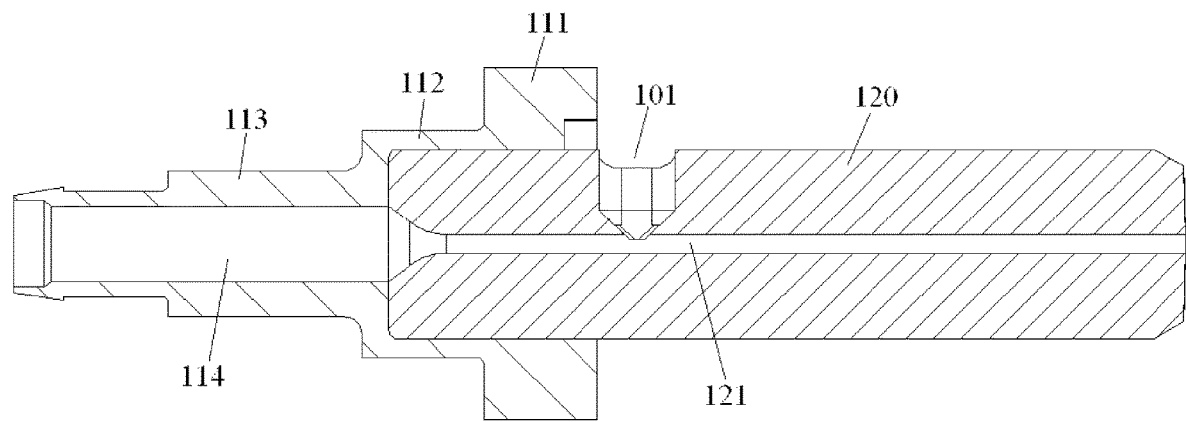

FIG. 2a is an illustrative view of a ferrule assembly 100 of a fiber optic connector according to a first exemplary embodiment of the present invention; FIG. 2b is a cross section view of the ferrule assembly 100 shown in FIG. 2a.

As shown in FIG. 2a and FIG. 2b, the ferrule assembly 100 mainly comprises a ferrule 120 and a rear seat 110. The ferrule 120 has a fiber bore 121 for receiving a fiber 210 therein. The rear seat 110 is connected to a rear end of the ferrule 120. The rear seat 110 is formed with a hollow chamber 114 passing through the rear seat 110 in a longitudinal direction of the rear seat 110. The hollow chamber 114 runs through the rear seat 110 and is in communication with the fiber bore 121 of the ferrule 120.

In the illustrated embodiment shown in FIGS. 2a and 2b, an adhesive injection hole 101 is formed in an external profile surface (outer peripheral surface) of the ferrule 120, which is perpendicular to the longitudinal direction of the ferrule assembly, and directly in communication with the fiber bore 121 of the ferrule 120.

Referring to FIG. 2a and FIG. 2b again, in the illustrated embodiment, the adhesive injection hole 101 has an outer opening at an outside of the ferrule 120 and an inner opening at an inside of the ferrule 120. The inner opening of the injection hole 101 is configured to be smaller than the outer opening of the injection hole 101, so as to prevent an adhesive injection needle (not shown) inserted through the outer opening of the injection hole 101 from entering into the fiber bore 121 of the ferrule 120. In this way, it may protect the fiber (see FIG. 9a) inserted into the ferrule assembly 100 from being touched and damaged by the adhesive injection needle.

In an exemplary embodiment of the present invention, the adhesive injection hole 101 has a dimension reducing from the outside toward the inside of the ferrule 120 in a stepped manner or a tapered manner.

In the illustrated embodiment shown in FIGS. 2a and 2b, only a single adhesive injection hole 101 is formed in the ferrule 120. But the present invention is not limited to this, two or more adhesive injection holes 101 may be formed in the ferrule 120.

In the illustrated embodiment shown in FIGS. 2a and 2b, an angle between the injection hole 101 and the fiber bore 121 is substantially equal to 90 degrees, that is, the injection hole 101 is substantially perpendicular to the fiber bore 121. But the present invention is not limited to this, the angle between the injection hole 101 and the fiber bore 121 may be set to be any angle larger than 0 degree.

In the illustrated embodiment shown in FIGS. 2a and 2b, the injection hole 101 has rectangular cross section. But the present invention is not limited to this, the cross section of the injection hole may have a circular shape, an oval shape, a polygonal shape or any other suitable shape.

Figure 3A:
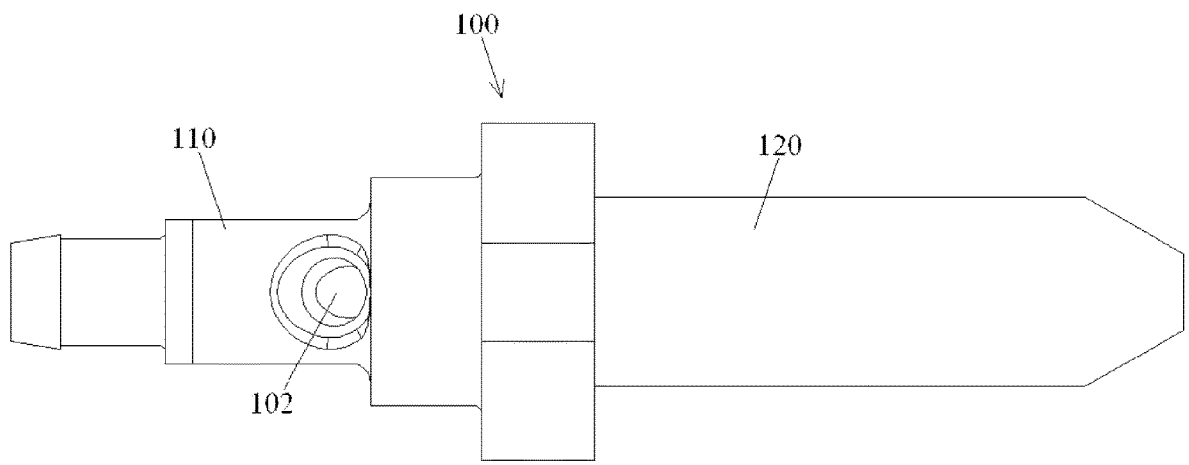
FIG. 3a is an illustrative view of a ferrule assembly of a fiber optic connector according to a second exemplary embodiment of the present invention.
Figure 3B:
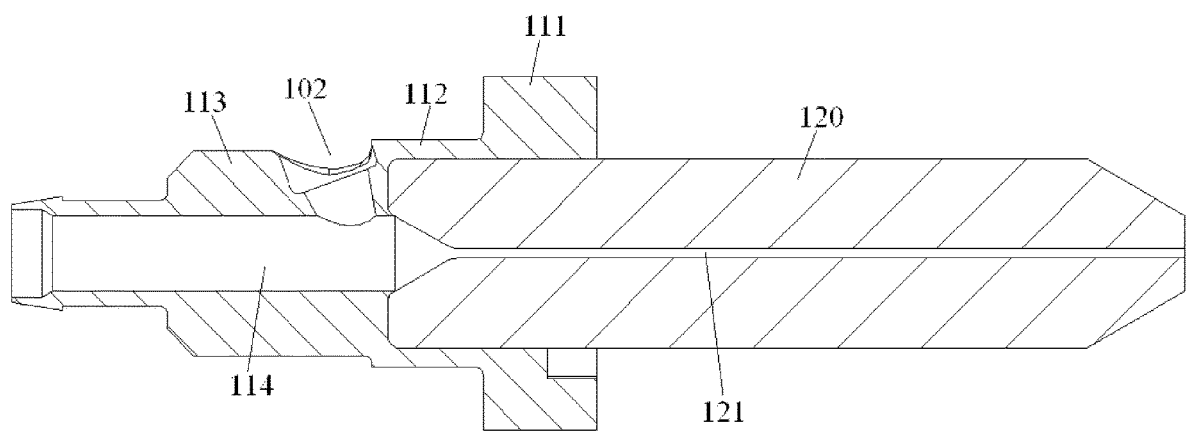

FIG. 3a is an illustrative view of a ferrule assembly 100 of a fiber optic connector according to a second exemplary embodiment of the present invention; FIG. 3b is a cross section view of the ferrule assembly 100 shown in FIG. 3a.

As shown in FIG. 3a and FIG. 3b, the ferrule assembly 100 mainly comprises a ferrule 120 and a rear seat 110. The ferrule 120 has a fiber bore 121 for receiving a fiber 210 therein. The rear seat 110 is connected to a rear end of the ferrule 120. The rear seat 110 is formed with a hollow chamber 114 passing through the rear seat 110 in a longitudinal direction of the rear seat 110. The hollow chamber 114 runs through the rear seat 110 and is in communication with the fiber bore 121 of the ferrule 120.

In the illustrated embodiment shown in FIGS. 3a and 3b, an adhesive injection hole 102 is formed in an external profile surface (outer peripheral surface) of the rear seat 110 and directly in communication with the hollow chamber 114 of the rear seat 110.

Referring to FIGS. 3a and 3b again, the fiber bore 121 at the rear end of the ferrule 120 is formed in a horn shaped opening gradually expanded toward the hollow chamber 114 of the rear seat 110 and communicated with the hollow chamber 114. The injection hole 102 has an inner opening adjacent to the horn shaped opening.

Referring to FIGS. 3a and 3b again, in the illustrated embodiment, the injection hole 102 has an outer opening at an outside of the rear seat 110 and an inner opening at an inside of the rear seat 110. The inner opening of the injection hole 102 is configured to be smaller than the outer opening of the injection hole 102, so as to limit a distance of an adhesive injection needle (not shown) inserted through the outer opening of the injection hole 102 entering into the hollow chamber 114 of the rear seat 110. In this way, it may protect the fiber (see FIG. 9a) inserted into the ferrule assembly 100 from being touched and damaged by the adhesive injection needle.

In an exemplary embodiment of the present invention, the adhesive injection hole 102 has a dimension reducing from the outside toward the inside of the rear seat 110 in a stepped manner or a tapered manner.

In the illustrated embodiment shown in FIGS. 3a and 3b, only a single adhesive injection hole 102 is formed in the rear seat 110. But the present invention is not limited to this, two or more adhesive injection holes 102 may be formed in the rear seat 110.

In the illustrated embodiment shown in FIGS. 3a and 3b, an angle between the injection hole 102 and the fiber bore 121 is substantially equal to 90 degrees, that is, the injection hole 102 is substantially perpendicular to the fiber bore 121. But the present invention is not limited to this, the angle between the injection hole 102 and the fiber bore 121 may be set to be any angle larger than 0 degree.

In the illustrated embodiment shown in FIGS. 3a and 3b, the injection hole 102 has a circular cross section. But the present invention is not limited to this, the cross section of the injection hole may have a rectangular shape, an oval shape, a polygonal shape or any other suitable shape.

Figure 4A:
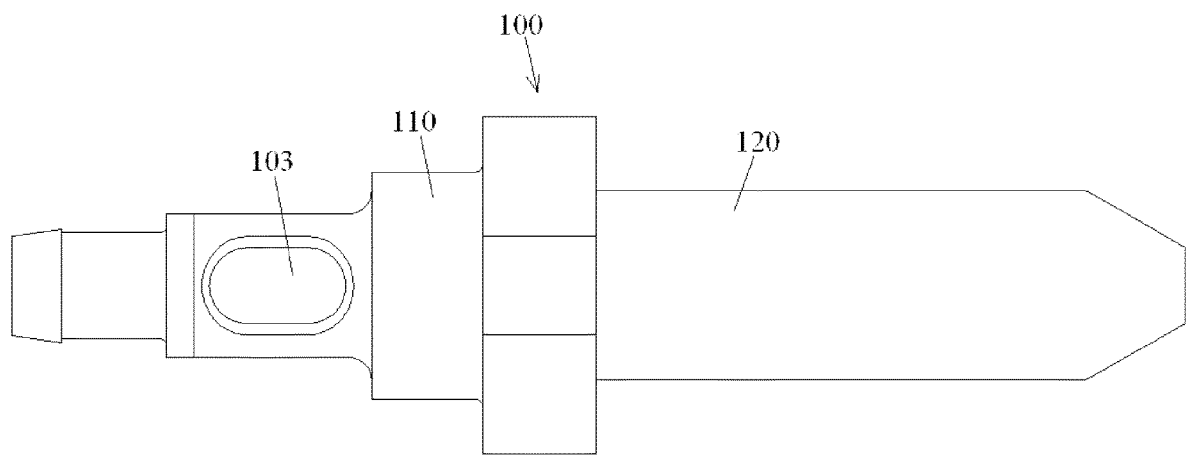
FIG. 4a is an illustrative view of a ferrule assembly of a fiber optic connector according to a third exemplary embodiment of the present invention.
Figure 4B:
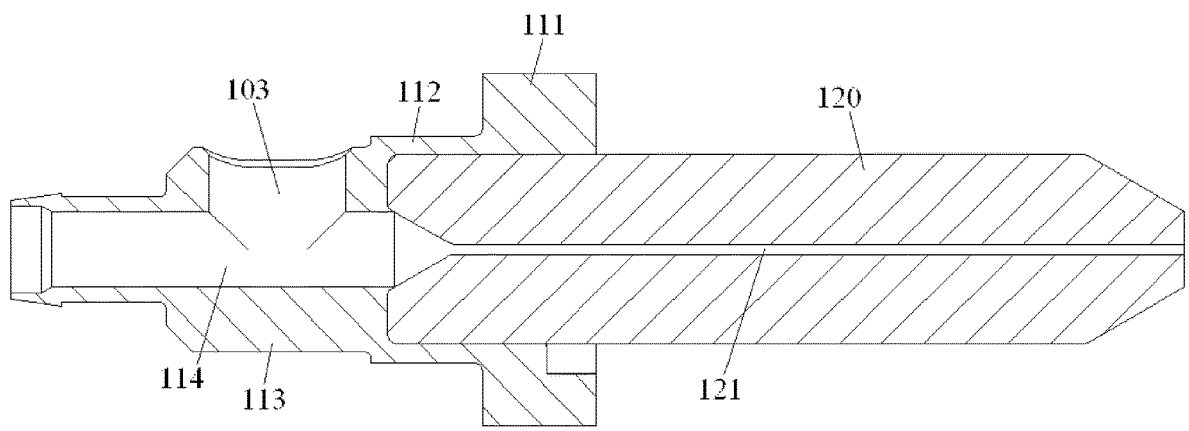

FIG. 4a is an illustrative view of a ferrule assembly 100 of a fiber optic connector according to a third exemplary embodiment of the present invention; FIG. 4b is a cross section view of the ferrule assembly 100 shown in FIG. 4a.

As shown in FIG. 4a and FIG. 4b, the ferrule assembly 100 mainly comprises a ferrule 120 and a rear seat 110. The ferrule 120 has a fiber bore 121 for receiving a fiber 210 therein. The rear seat 110 is connected to a rear end of the ferrule 120. The rear seat 110 is formed with a hollow chamber 114 passing through the rear seat 110 in a longitudinal direction of the rear seat 110. The hollow chamber 114 runs through the rear seat 110 and is in communication with the fiber bore 121 of the ferrule 120.

In the illustrated embodiment shown in FIGS. 4a and 4b, an adhesive injection hole 103 is formed in an external profile surface (outer peripheral surface) of the rear seat 110 and directly in communication with the hollow chamber 114 of the rear seat 110.

Referring to FIGS. 4a and 4b again, the injection hole 103 is relative large and has an elongated slot shape extending in the longitudinal direction. In this way, the injection hole 103 may receive more adhesive therein, and may prevent the adhesive from overflowing out of the injection hole 103 when the adhesive does not flow into the fiber bore 121 of the ferrule assembly in time.

Referring to FIGS. 4a and 4b again, in the illustrated embodiment, the injection hole 103 has an outer opening at an outside of the rear seat 110 and an inner opening at an inside of the rear seat 110. The inner opening of the injection hole 103 is configured to be smaller than the outer opening of the injection hole 103, so as to limit a distance of an adhesive injection needle (not shown) inserted through the outer opening of the injection hole 103 entering into the hollow chamber 114 of the rear seat 110. In this way, it may protect the fiber (see FIG. 9a) inserted into the ferrule assembly 100 from being touched and damaged by the adhesive injection needle.

In an exemplary embodiment of the present invention, the adhesive injection hole 103 has a dimension reducing from the outside toward the inside of the rear seat 110 in a stepped manner or a tapered manner.

In the illustrated embodiment shown in FIGS. 4a and 4b, only a single adhesive injection hole 103 is formed in the rear seat 110. But the present invention is not limited to this, two or more adhesive injection holes 103 may be formed in the rear seat 110.

In the illustrated embodiment shown in FIGS. 4a and 4b, an angle between the injection hole 103 and the fiber bore 121 is substantially equal to 90 degrees, that is, the injection hole 103 is substantially perpendicular to the fiber bore 121. But the present invention is not limited to this, the angle between the injection hole 103 and the fiber bore 121 may be set to be any angle larger than 0 degree.

In the illustrated embodiment shown in FIGS. 4a and 4b, the injection hole 103 has an elongated slot shaped cross section. But the present invention is not limited to this, the cross section of the injection hole may have a rectangular shape, a circular shape, an oval shape, a polygonal shape or any other suitable shape.

Figure 5A:
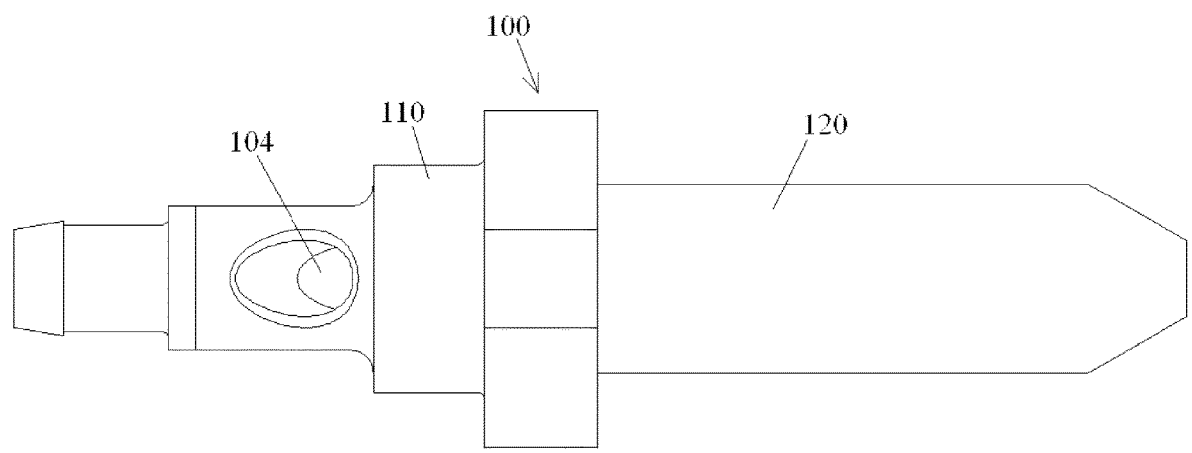
FIG. 5a is an illustrative view of a ferrule assembly of a fiber optic connector according to a fourth exemplary embodiment of the present invention.
Figure 5B:
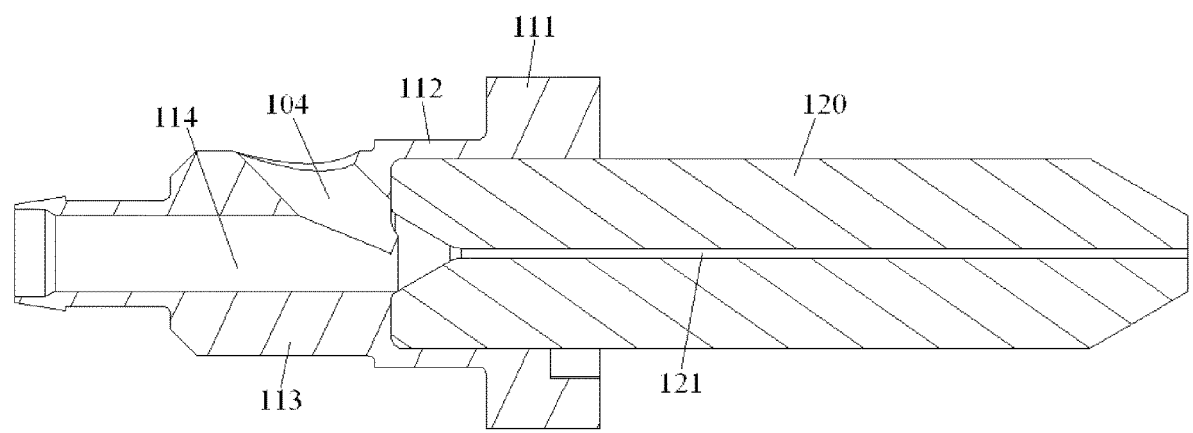

FIG. 5a is an illustrative view of a ferrule assembly 100 of a fiber optic connector according to a fourth exemplary embodiment of the present invention; FIG. 5b is a cross section view of the ferrule assembly 100 shown in FIG. 5a.

As shown in FIG. 5a and FIG. 5b, the ferrule assembly 100 mainly comprises a ferrule 120 and a rear seat 110. The ferrule 120 has a fiber bore 121 for receiving a fiber 210 therein. The rear seat 110 is connected to a rear end of the ferrule 120. The rear seat 110 is formed with a hollow chamber 114 passing through the rear seat 110 in a longitudinal direction of the rear seat 110. The hollow chamber 114 runs through the rear seat 110 and is in communication with the fiber bore 121 of the ferrule 120.

In the illustrated embodiment shown in FIGS. 5a and 5b, an adhesive injection hole 104 is formed in an external profile surface (outer peripheral surface) of the rear seat 110 and directly in communication with the hollow chamber 114 of the rear seat 110.

Referring to FIGS. 5a and 5b again, the fiber bore 121 at the rear end of the ferrule 120 is formed in a horn shaped opening gradually expanded toward the hollow chamber 114 of the rear seat 110 and communicated with the hollow chamber 114. The injection hole 104 has an inner opening adjacent to the horn shaped opening.

Referring to FIGS. 5a and 5b again, in the illustrated embodiment, the injection hole 104 has an outer opening at an outside of the rear seat 110 and an inner opening at an inside of. The inner opening of the injection hole 104 is configured to be smaller than the outer opening of the injection hole 104, so as to limit a distance of an adhesive injection needle (not shown) inserted through the outer opening of the injection hole 104 entering into the hollow chamber 114 of the rear seat 110. In this way, it may protect the fiber (see FIG. 9a) inserted into the ferrule assembly 100 from being touched and damaged by the adhesive injection needle.

In an exemplary embodiment of the present invention, the adhesive injection hole 104 has a dimension reducing from the outside toward the inside of the rear seat 110 in a stepped manner or a tapered manner.

In the illustrated embodiment shown in FIGS. 5a and 5b, only a single adhesive injection hole 104 is formed in the rear seat 110. But the present invention is not limited to this, two or more adhesive injection holes 104 may be formed in the rear seat 110.

In the illustrated embodiment shown in FIGS. 5a and 5b, an angle between the injection hole 104 and the fiber bore 121 is substantially equal to 45 degrees. But the present invention is not limited to this, the angle between the injection hole 104 and the fiber bore 121 may be set to be any angle larger than 0 degree. In the illustrated embodiment, by reducing the angle between the injection hole 104 and the fiber bore 121, and the inner opening of the injection hole 104 is closer to the horn shaped opening at the rear end of the ferrule 120. In this way, the injection hole 104 may receive more adhesive than, for example, the injection hole 102 shown in FIGS. 3a and 3b.

In the illustrated embodiment shown in FIGS. 5a and 5b, the injection hole 104 has a circular cross section. But the present invention is not limited to this, the cross section of the injection hole may have a rectangular shape, an oval shape, a polygonal shape or any other suitable shape.

Figure 6A:
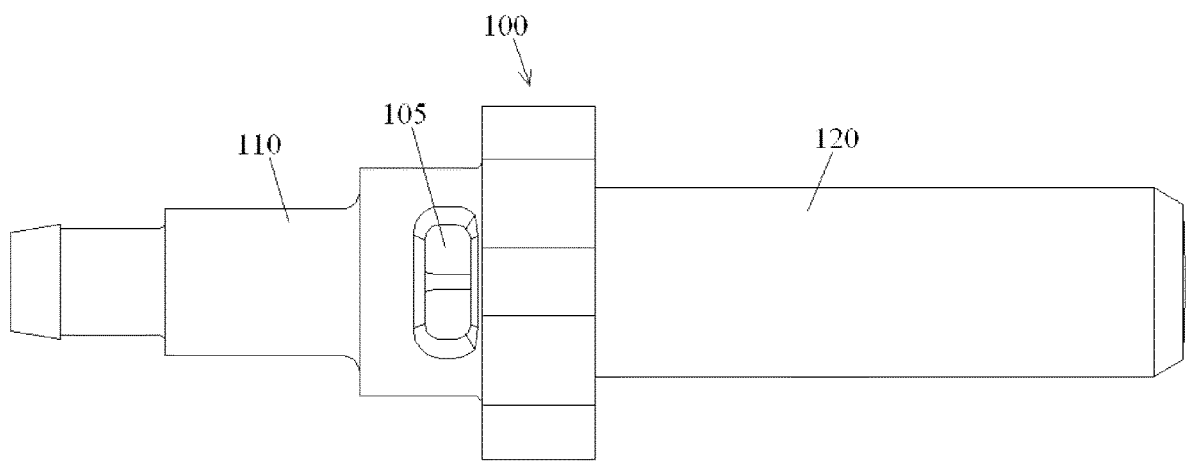
FIG. 6a is an illustrative view of a ferrule assembly of a fiber optic connector according to a fifth exemplary embodiment of the present invention.
Figure 6B:
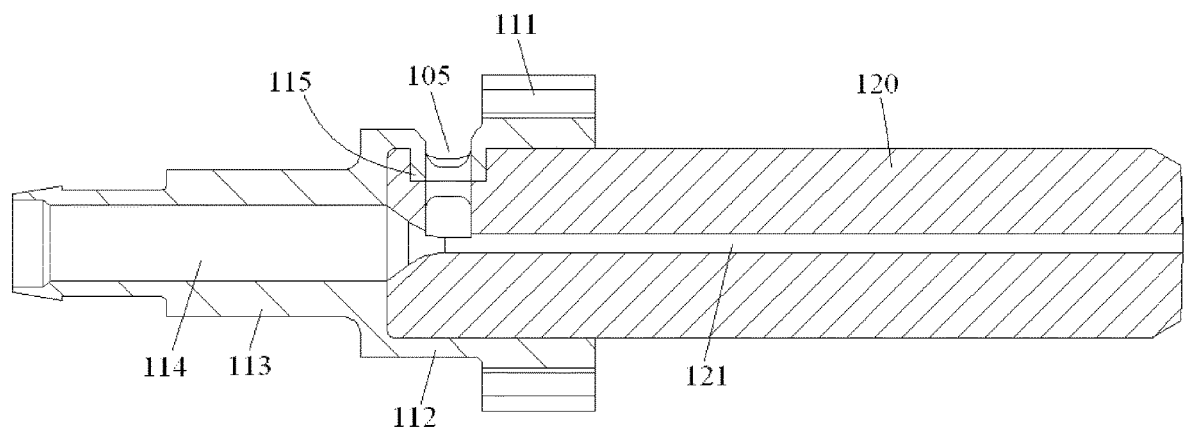

FIG. 6a is an illustrative view of a ferrule assembly 100 of a fiber optic connector according to a fifth exemplary embodiment of the present invention; FIG. 6b is a cross section view of the ferrule assembly 100 shown in FIG. 6a.

As shown in FIG. 6a and FIG. 6b, the ferrule assembly 100 mainly comprises a ferrule 120 and a rear seat 110. The ferrule 120 has a fiber bore 121 for receiving a fiber 210 therein. The rear seat 110 is connected to a rear end of the ferrule 120. The rear seat 110 is formed with a hollow chamber 114 passing through the rear seat 110 in a longitudinal direction of the rear seat 110. The hollow chamber 114 runs through the rear seat 110 and is in communication with the fiber bore 121 of the ferrule 120.

In the illustrated embodiment shown in FIGS. 6a and 6b, an adhesive injection hole 105 is formed at a joint location 112 of the ferrule 120 and the rear seat 110 and directly communicated with the fiber bore 121 at the rear end of the ferrule 120.

Referring to FIGS. 6a and 6b again, an engagement protrusion 115 is formed inside the rear seat 110 and engaged into a recess in the external profile surface of the ferrule 120 at the rear end of the ferrule 120, so as to enhance the joining strength between the rear seat 110 and the ferrule 120.

Referring to FIGS. 6a and 6b again, in the illustrated embodiment, the injection hole 105 is formed in the engagement protrusion 115 and passes through the engagement protrusion 115.

Referring to FIGS. 6a and 6b again, the fiber bore 121 at the rear end of the ferrule 120 is formed in a horn shaped opening gradually expanded toward the hollow chamber 114 of the rear seat 110 and communicated with the hollow chamber 114. The injection hole 105 has an inner opening adjacent to the horn shaped opening.

Referring to FIGS. 6a and 6b again, in the illustrated embodiment, the injection hole 105 has an outer opening at an outside of the rear seat 110 and an inner opening at an inside of. The inner opening of the injection hole 105 is configured to be smaller than the outer opening of the injection hole 105, so as to limit a distance of an adhesive injection needle (not shown) inserted through the outer opening of the injection hole 105 entering into the fiber bore 121 of the ferrule 120. In this way, it may protect the fiber (see FIG. 9a) inserted into the ferrule assembly 100 from being touched and damaged by the adhesive injection needle.

In an exemplary embodiment of the present invention, the adhesive injection hole 105 has a dimension reducing from the outside toward the inside of the ferrule 120 in a stepped manner or a tapered manner.

In the illustrated embodiment shown in FIGS. 6a and 6b, only a single adhesive injection hole 105 is formed at the joint location 112 of the ferrule 120 and the rear seat 110. But the present invention is not limited to this, two or more adhesive injection holes 105 may be formed.

In the illustrated embodiment shown in FIGS. 6a and 6b, an angle between the injection hole 105 and the fiber bore 121 is substantially equal to 90 degrees, that is, the injection hole 105 is substantially perpendicular to the fiber bore 121. But the present invention is not limited to this, the angle between the injection hole 105 and the fiber bore 121 may be set to be any angle larger than 0 degree.

In the illustrated embodiment shown in FIGS. 6a and 6b, the injection hole 105 has a rectangular cross section. But the present invention is not limited to this, the cross section of the injection hole may have a circular shape, an oval shape, a polygonal shape or any other suitable shape.

Figure 7A:
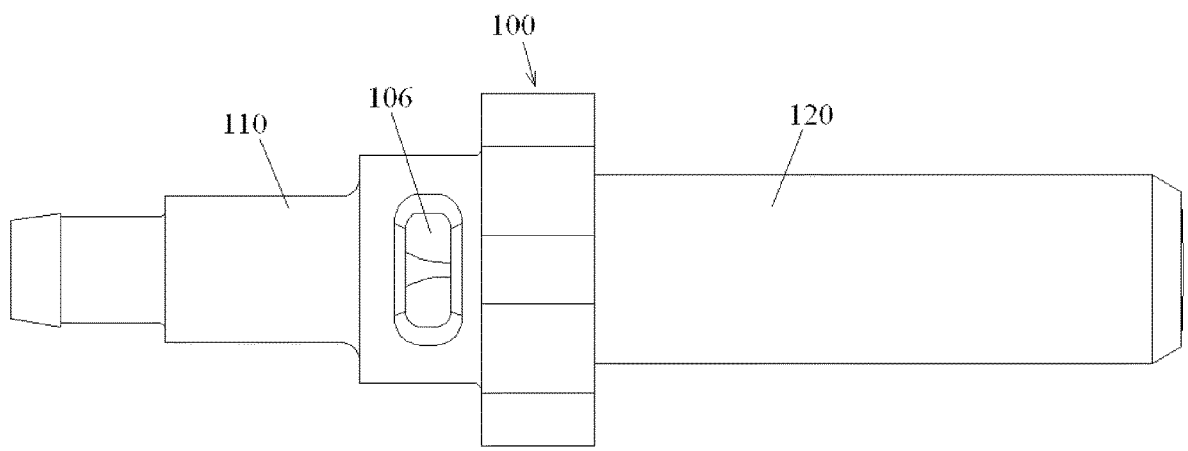
FIG. 7a is an illustrative view of a ferrule assembly of a fiber optic connector according to a sixth exemplary embodiment of the present invention.
Figure 7B:
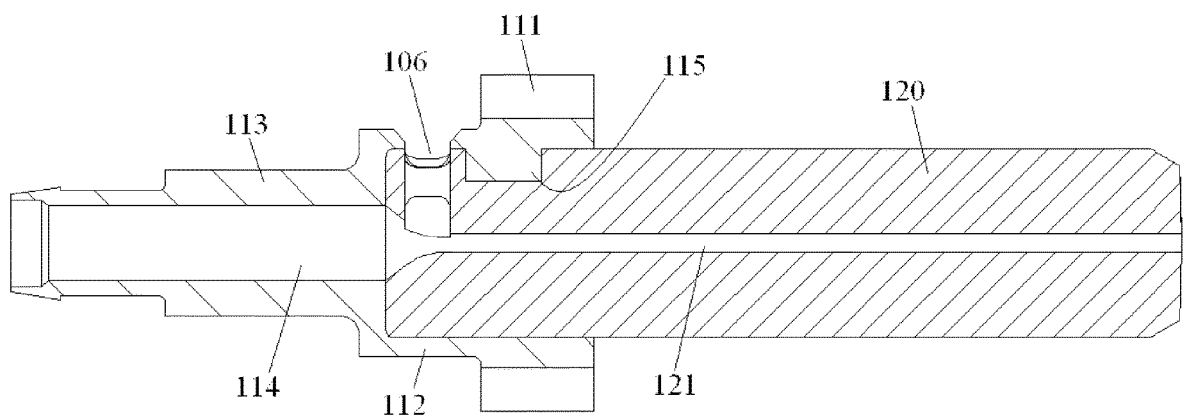

FIG. 7a is an illustrative view of a ferrule assembly 100 of a fiber optic connector according to a sixth exemplary embodiment of the present invention; FIG. 7b is a cross section view of the ferrule assembly 100 shown in FIG. 7a.

As shown in FIG. 7a and FIG. 7b, the ferrule assembly 100 mainly comprises a ferrule 120 and a rear seat 110. The ferrule 120 has a fiber bore 121 for receiving a fiber 210 therein. The rear seat 110 is connected to a rear end of the ferrule 120. The rear seat 110 is formed with a hollow chamber 114 passing through the rear seat 110 in a longitudinal direction of the rear seat 110. The hollow chamber 114 runs through the rear seat 110 and is in communication with the fiber bore 121 of the ferrule 120.

In the illustrated embodiment shown in FIGS. 7a and 7b, an adhesive injection hole 106 is formed at a joint location 112 of the ferrule 120 and the rear seat 110 and directly communicated with the fiber bore 121 at the rear end of the ferrule 120.

Referring to FIGS. 7a and 7b again, an engagement protrusion 115 is formed inside the rear seat 110 and engaged into a recess in the external profile surface of the ferrule 120 at the rear end of the ferrule 120, so as to enhance the joining strength between the rear seat 110 and the ferrule 120.

Referring to FIGS. 7a and 7b again, in the illustrated embodiment, the injection hole 105 is positioned behind the engagement protrusion 115 and does not overlap with engagement protrusion 115. As a result, the injection hole 106 does not run through the engagement protrusion 115.

Referring to FIGS. 7a and 7b again, the fiber bore 121 at the rear end of the ferrule 120 is formed in a horn shaped opening gradually expanded toward the hollow chamber 114 of the rear seat 110 and is communicated with the hollow chamber 114. The injection hole 106 has an inner opening substantially located at the horn shaped opening.

Referring to FIGS. 7a and 7b again, in the illustrated embodiment, the injection hole 106 has an outer opening at an outside of the ferrule assembly 100 and an inner opening at an inside of the ferrule assembly 100. The inner opening of the injection hole 106 is configured to be smaller than the outer opening of the injection hole 106, so as to limit a distance of an adhesive injection needle (not shown) inserted through the outer opening of the injection hole 106 entering into the fiber bore 121 of the ferrule 120. In this way, it may protect the fiber (see FIG. 9a) inserted into the ferrule assembly 100 from being touched and damaged by the adhesive injection needle.

In an exemplary embodiment of the present invention, the adhesive injection hole 106 has a dimension reducing from the outside toward the inside of the ferrule 120 in a stepped manner or a tapered manner.

In the illustrated embodiment shown in FIGS. 7a and 7b, only a single adhesive injection hole 106 is formed at the joint location 112 of the ferrule 120 and the rear seat 110. But the present invention is not limited to this, two or more adhesive injection holes 106 may be formed.

In the illustrated embodiment shown in FIGS. 7a and 7b, an angle between the injection hole 106 and the fiber bore 121 is substantially equal to 90 degrees, that is, the injection hole 106 is substantially perpendicular to the fiber bore 121. But the present invention is not limited to this, the angle between the injection hole 106 and the fiber bore 121 may be set to be any angle larger than 0 degree.

In the illustrated embodiment shown in FIGS. 7a and 7b, the injection hole 106 has a rectangular cross section. But the present invention is not limited to this, the cross section of the injection hole may have a circular shape, an oval shape, a polygonal shape or any other suitable shape.

Figure 9A:
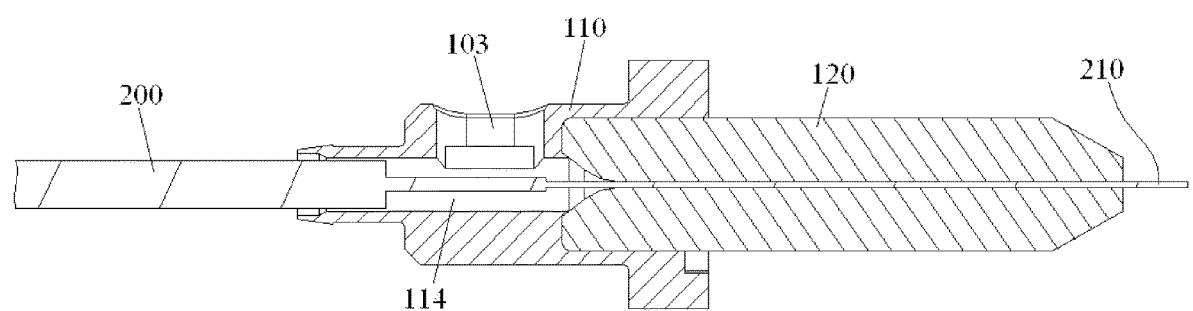
FIG. 9a is a cross section view of inserting a fiber into the ferrule assembly before filling the adhesive into the ferrule assembly according to an exemplary embodiment of the present invention.
Figure 9B:
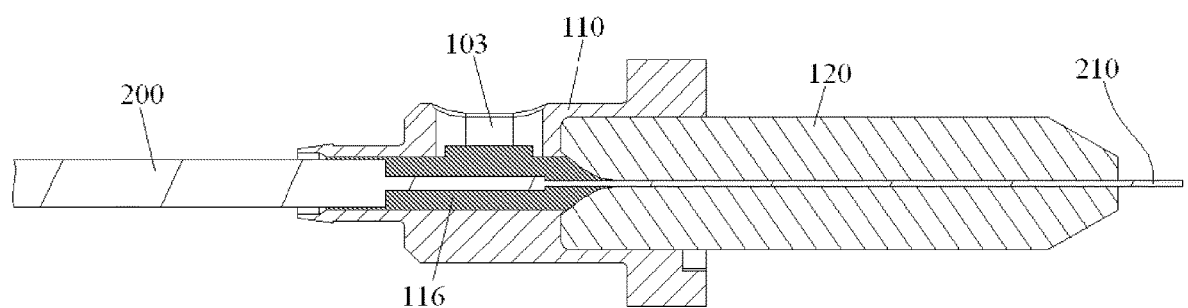
FIG. 9b is a cross section view of injecting the adhesive into the ferrule assembly after inserting the fiber into the ferrule assembly according to an exemplary embodiment of the present invention.

FIG. 9a is a cross section view of inserting a fiber into the ferrule assembly before filling the adhesive into the ferrule assembly according to an exemplary embodiment of the present invention; FIG. 9b is a cross section view of injecting the adhesive into the ferrule assembly after inserting the fiber into the ferrule assembly according to an exemplary embodiment of the present invention.

In an exemplary embodiment of the present invention, as shown in FIG. 9a, the fiber 210 is firstly inserted into the fiber bore 121 of the ferrule assembly 100 without adhesive (the ferrule shown in FIGS. 4a and 4b), then, as shown in FIG. 9b, the adhesive 116 is injected into the ferrule assembly 100 into which the fiber 210 has been inserted, and the fiber 210 is fixed in the fiber bore 121 by the adhesive 116. As a result, a fiber optic ferrule device is formed.

According to another general concept of the present invention, there is provided a method for manufacturing a fiber optic ferrule device, comprising steps of: providing a ferrule assembly; inserting a fiber into a fiber bore of the ferrule assembly until the fiber protrudes a predetermined distance from a front end surface of the ferrule assembly; filling an adhesive into the ferrule assembly; and sucking the adhesive from the front end of the ferrule assembly, so that the adhesive flows to the front end surface of the ferrule assembly through a gap between the fiber and the fiber bore until a predetermined size of adhesive bump is formed on the front end surface of the ferrule assembly.

Figure 8:
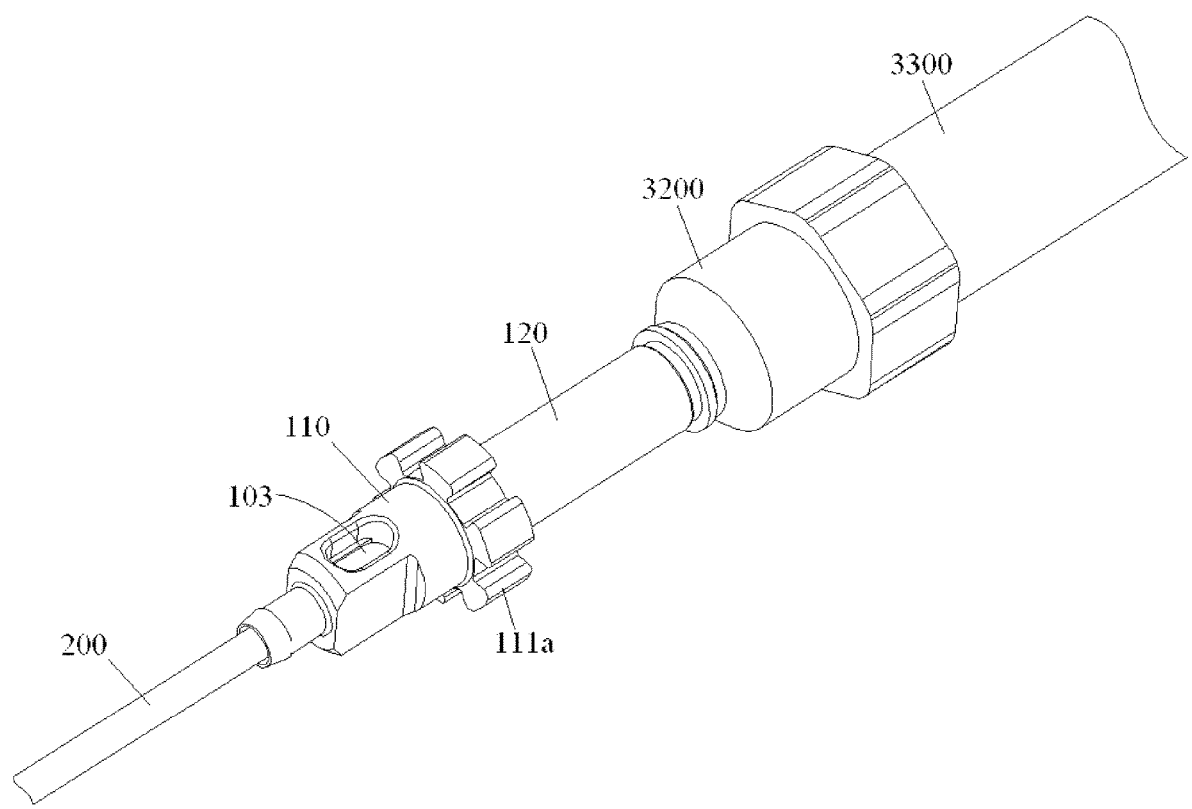
FIG. 8 is an illustrative view of sucking an adhesive filled in a ferrule assembly from a front end of the ferrule assembly by means of a vacuum suction module according to an exemplary embodiment of the present invention.
Figure 9C:
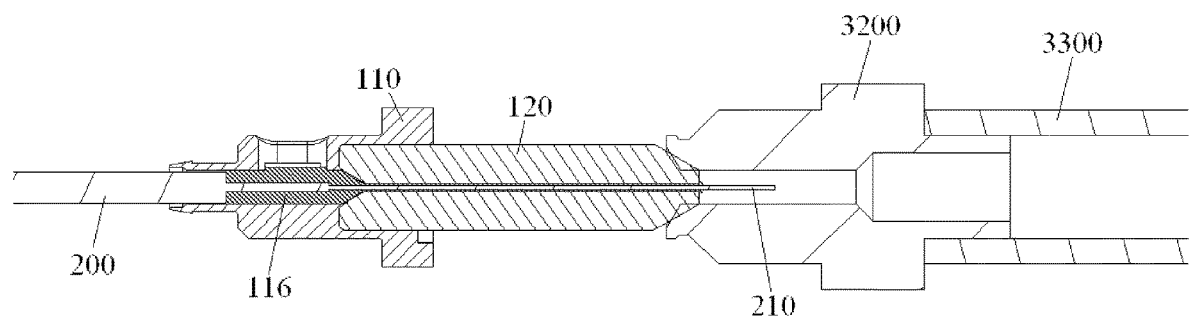
FIG. 9c is a cross section view of the ferrule assembly and the vacuum suction module of FIG. 8, showing the adhesive filled in the ferrule assembly is sucked from the front end of the ferrule assembly by the vacuum suction module.
Figure 9D:
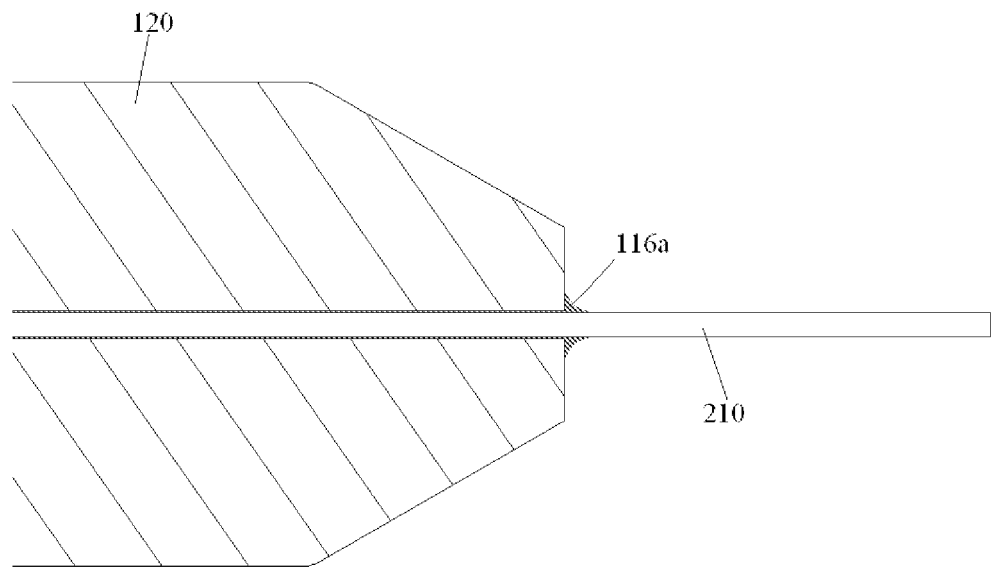
FIG. 9d is an enlarged cross section view of a adhesive bump formed on the front end of the ferrule assembly after the adhesive is sucked onto the front end of the ferrule assembly.

Hereafter, it will describe a method of manufacturing a ferrule device according to an exemplary embodiment with reference to FIGS. 4a, 4b, 8-10, the method mainly comprises steps of:

S100: providing a ferrule assembly 100 (for example, the ferrule assembly 100 shown in FIGS. 4a and 4b or FIGS. 2a-3b, 5a-7b) in which the adhesive is not filled yet;

S110: as shown in FIG. 9a, inserting a fiber 210 into the ferrule assembly 100 without adhesive until the fiber 210 protrudes a predetermined distance from a front end surface of the ferrule assembly 100;

S120: as shown in FIG. 9b, filling an adhesive 116 into the ferrule assembly 100 through an adhesive injection hole 103 formed in an external profile surface of the ferrule assembly 100 after the fiber 210 is inserted into the ferrule assembly 100; and S130: as shown in FIGS. 8 and 9c, sucking the adhesive 116 from the front end of the ferrule assembly 100 by means of a vacuum suction device (to be described later) with vacuum suction nozzles 3200, so that the adhesive 116 flows to the front end surface of the ferrule assembly 100 through a gap between the fiber 210 and the fiber bore 121 until a predetermined sized adhesive bump 116a is formed on the front end surface of the ferrule assembly 100, as shown in FIG. 9d.

Figure 10:
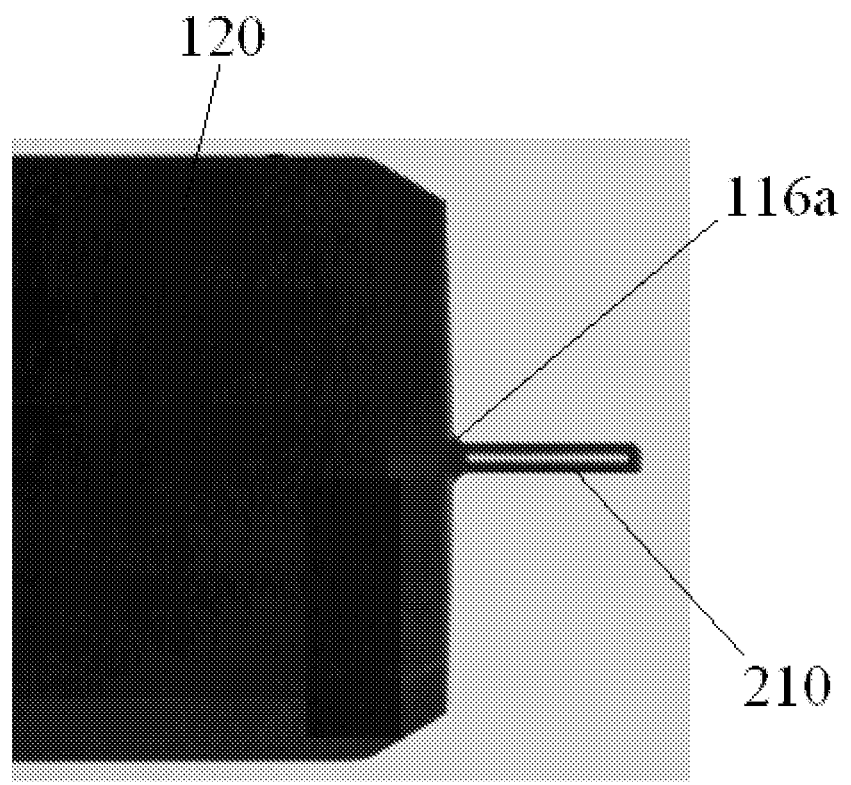
FIG. 10 is an illustrative enlarged view of the front end of the ferrule assembly captured by a camera.

FIG. 10 is an illustrative enlarged view of the front end of the ferrule assembly captured by a camera.

As shown in FIG. 10, in an exemplary embodiment of the present invention, the size of the adhesive bump 116a formed on the front end surface of the ferrule assembly 100 is identified by a visual recognition device. For instance, firstly, capturing an image of the adhesive bump 116a formed on the front end surface of the ferrule assembly 100 by a camera, and processing and identifying the captured image, so as to identify the size and/or shape of the adhesive bump 116a formed on the front end surface of the ferrule assembly 100.

In above embodiments of the present invention, after the adhesive is fully filled in the gap between the fiber 210 and the fiber bore 121 of the ferrule assembly 100, the fiber 210 protruding from the front end surface of the ferrule assembly 100 is clean because the fiber 210 is inserted into the fiber bore 121 before filling the adhesive. As a result, there is no adhesive adhered on the fiber 210 protruding from the front end surface of the ferrule assembly 100, ensuring the optical property of the fiber 210.

Figure 11:
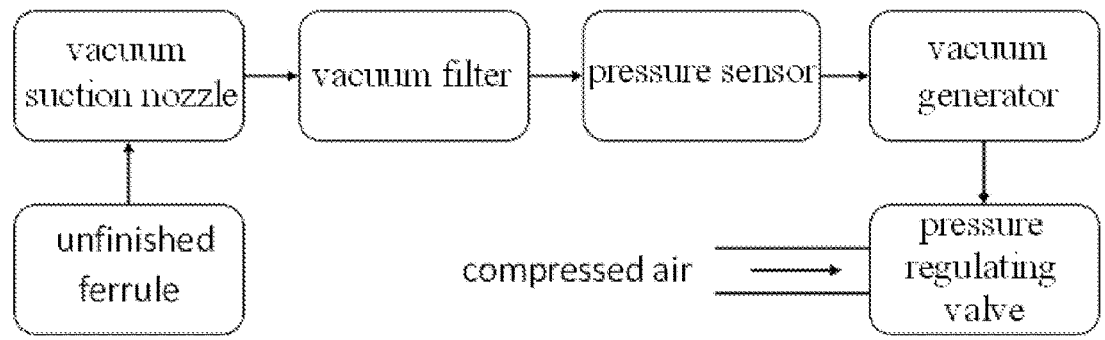
FIG. 11 is an illustrative block view of the vacuum suction module according to an exemplary embodiment of the present invention.

FIG. 11 is an illustrative block view of the vacuum suction module according to an exemplary embodiment of the present invention.

As shown in FIGS. 9c and 11, in the illustrated embodiment, the vacuum suction device 3000 mainly comprises a vacuum generator and a vacuum suction nozzle 3200. The vacuum suction nozzle 3200 is adapted to be hermetically sucked on the front end of the ferrule assembly 100 and connected to a vacuum suction port of the vacuum generator through a connection pipe 3300.

Referring to FIGS. 9c and 11 again, in the illustrated embodiment, the vacuum suction device 3000 further comprises a pressure regulating valve connected to an inlet port of the vacuum generator, so as to adjust an inlet pressure of the vacuum generator.

Referring to FIG. 9c and again, in the illustrated embodiment, the vacuum suction device 3000 further comprises a pressure sensor provided on the connection pipe 3300 between the vacuum suction nozzle 3200 and the vacuum suction port of the vacuum generator, so as to sense a negative pressure value in the connection pipe 3300. In this way, it is possible to determine whether the vacuum suction nozzle 3200 is hermetically sucked on the front end of the ferrule assembly 100 based on the negative pressure value sensed by the pressure sensor. If the vacuum suction nozzle 3200 is not hermetically sucked on the front end of the ferrule assembly 100, air leakage is present, and the negative pressure value sensed by the pressure sensor cannot reach a predetermined value. Thereby, on one hand, if the negative pressure value sensed by the pressure sensor is less than the predetermined value, it may directly determine that air leakage is present. On the other hand, if the negative pressure value sensed by the pressure sensor is equal to or higher than the predetermined value, it may directly determine that air leakage is not present.

Referring to FIG. 11 again, in the illustrated embodiment, the vacuum suction device 3000 further comprises a vacuum filter provided in the connection pipe 3300 between the vacuum suction nozzle 3200 and the vacuum suction port of the vacuum generator. The vacuum filter is used to filter impurities from the air, so as to protect the vacuum generator from the impurities.

As shown in FIGS. 10 and 11, in an exemplary embodiment of the present invention, a controller (not shown) is provided to control the vacuum generator to generate a failure pressure to release the vacuum suction nozzle 3200 from the ferrule assembly 100 once the size and/or shape of the adhesive bump 116a formed on the front end surface of the ferrule assembly 100 and identified by the visual recognition device reaches the predetermined size and/or shape. After the vacuum suction nozzle 3200 is released from the ferrule assembly 100, a position of the fiber 210 in the fiber bore 121 of the ferrule assembly 100 may be calibrated, and an eccentricity orientation of the center of the fiber 210 with respect to an indexing feature of the ferrule assembly 100 (for example, an outer circumferential surface of a single-fiber ferrule or an alignment hole of a multi-fiber ferrule) may be adjusted to a predetermined orientation, and this will be described in detail later. After the position and the eccentricity orientation of the fiber 210 are calibrated and adjusted, the adhesive 116 may be cured to fix the fiber 210 in the fiber bore 121 of the ferrule assembly 100. After the fiber 210 is fixed in the fiber bore 121 of the ferrule assembly 100, the front end surface of the ferrule assembly 100 may be ground and polished. As a result, a ferrule assembly is manufactured.

According to another general concept of the present invention, there is provided a fiber optic alignment device for calibrating position accuracy of a fiber in a fiber bore of a ferrule assembly. The fiber optic alignment device comprises: a fixation block; an alignment element having a first end portion fixed in the fixation block and a second end portion formed with a protrudent platform, wherein an alignment groove is formed in the alignment element and extends to the end of the protrudent platform in a central axis of the alignment element; an alignment sleeve having a first end portion fitted on the second end portion of the alignment element and a second end portion opposite to the first end portion; and a spring element having a first end extending into the alignment sleeve and being pressed against the alignment groove in the protrudent platform in a direction perpendicular to the central axis of the alignment element. The fiber protrudes from the front end of the ferrule assembly, and the front end of the ferrule assembly is inserted into the alignment sleeve from the second end portion of the alignment sleeve until a predetermined length of the fiber protruding from the front end of the ferrule assembly enters into the alignment groove of the alignment element. When the front end of the ferrule assembly is inserted into the alignment sleeve and when the fiber is inserted into the alignment groove of the alignment element, the position accuracy of the fiber in the fiber bore of the ferrule assembly is calibrated to reach position accuracy of the fiber in the alignment groove of the alignment element. The first end of the spring element is configured to be pressed against the fiber inserted into the alignment groove, so that an eccentricity orientation of a center of the fiber with respect to a center of the alignment element is adjusted to a predetermined orientation and held in the predetermined orientation.

Figure 20A:
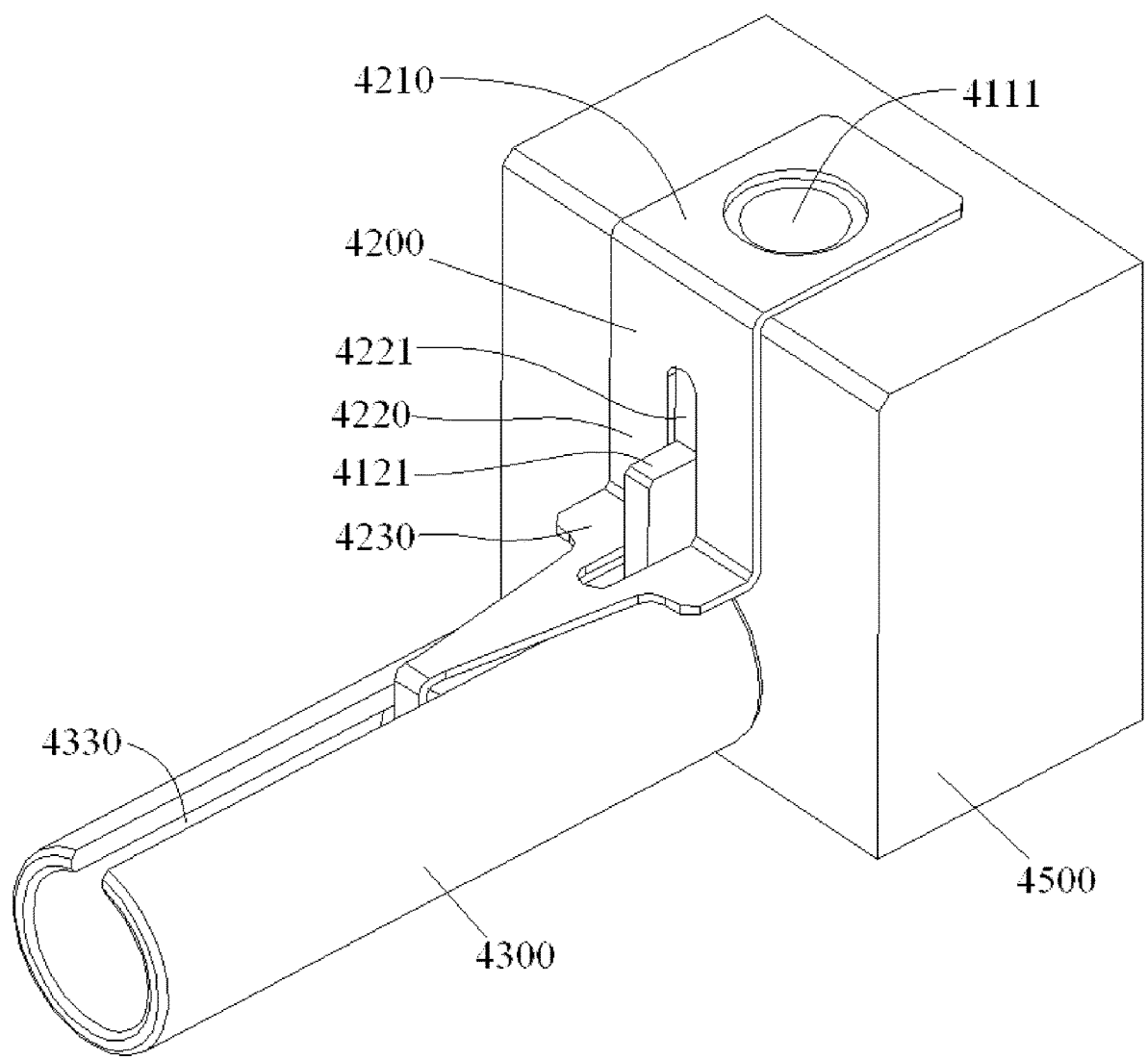
FIG. 20a is an illustrative local structure view of the fiber alignment module of FIGS. 19a and 19b.
Figure 20B:
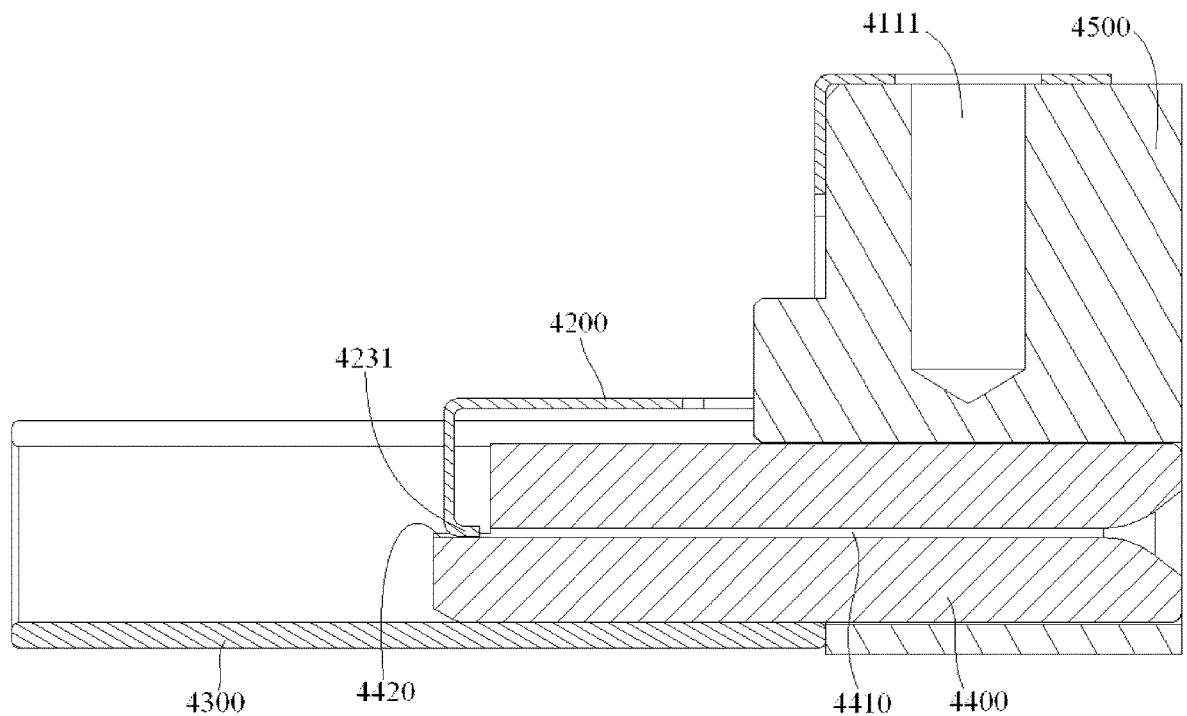
FIG. 20b is a local cross section view of the fiber alignment module.

FIG. 20a is an illustrative local structure view of the fiber alignment device (or referred as the fiber alignment module); FIG. 20b is a local cross section view of the fiber alignment device.

As shown in FIGS. 20a and 20b, in the illustrated embodiment, the fiber alignment device mainly comprises a fixation block 4500, an alignment element 4400, an alignment sleeve 4300 and a spring element 4200.

Referring to FIGS. 20a and 20b, the alignment element 4400 has a first end portion fixed in the fixation block 4500 and a second end portion formed with a protrudent platform 4420. An alignment groove 4410 is formed in the alignment element 4400 and extends to the end of the protrudent platform 4420 in a central axis of the alignment element 4400.

The alignment sleeve 4300 has a first end portion fitted on the second end portion of the alignment element 4400 and a second end portion opposite to the first end portion.

Figure 22:
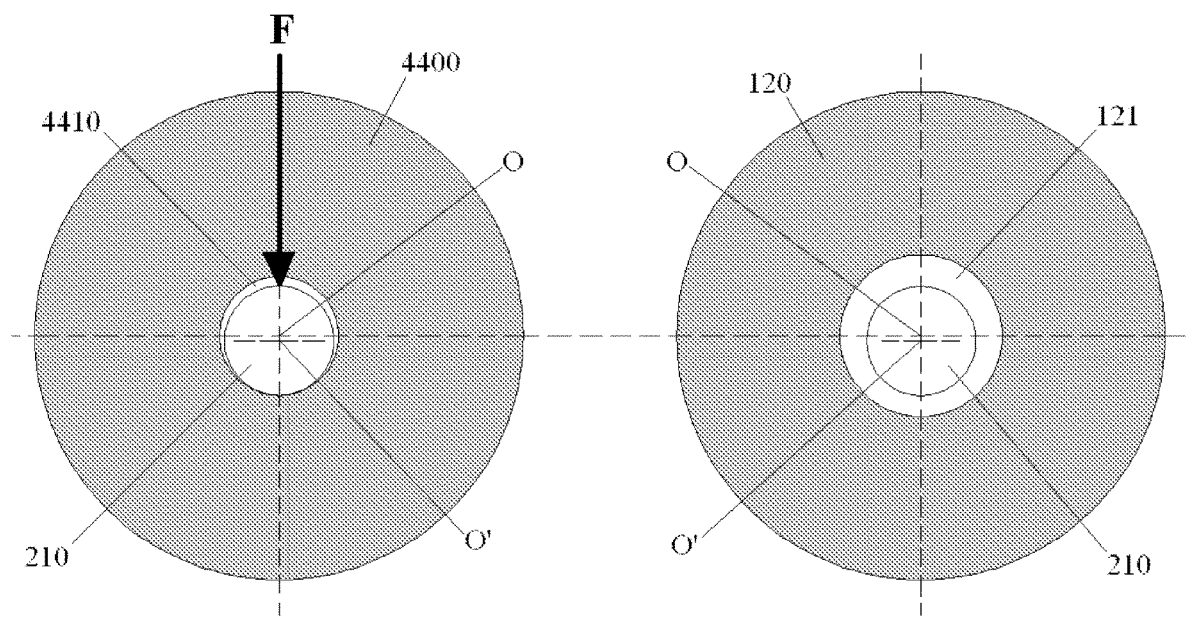
FIG. 22 is an principle view of adjusting an eccentricity orientation of the fiber by means of the fiber alignment module of FIG. 21b.

The spring element 4200 has a first end 4231 entering into the alignment sleeve 4300 and pressed against the alignment groove 4410 in the protrudent platform 4420 in a direction perpendicular to the central axis of the alignment element 4400 (see FIG. 22).

Figure 21A:
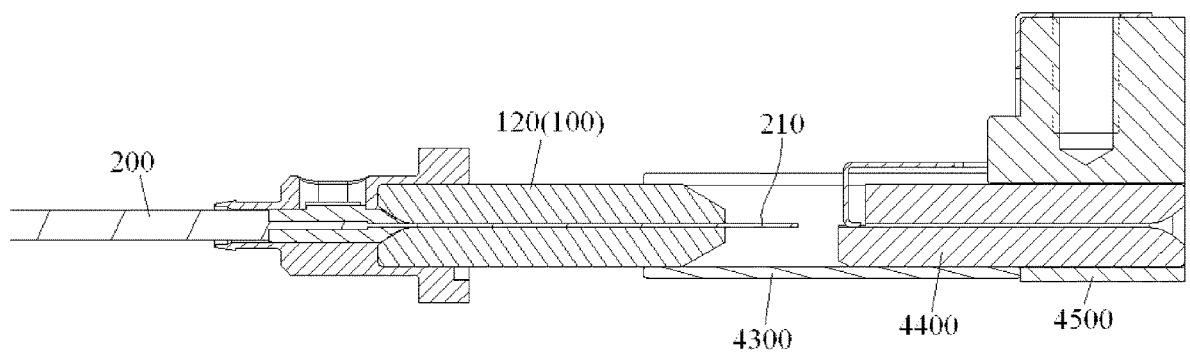
FIG. 21a is an illustrative view of inserting the front end of the ferrule assembly into the fiber alignment module of FIG. 20b, in which the fiber protruding from the front end of the ferrule assembly is not inserted into an alignment groove of an alignment element.
Figure 21B:
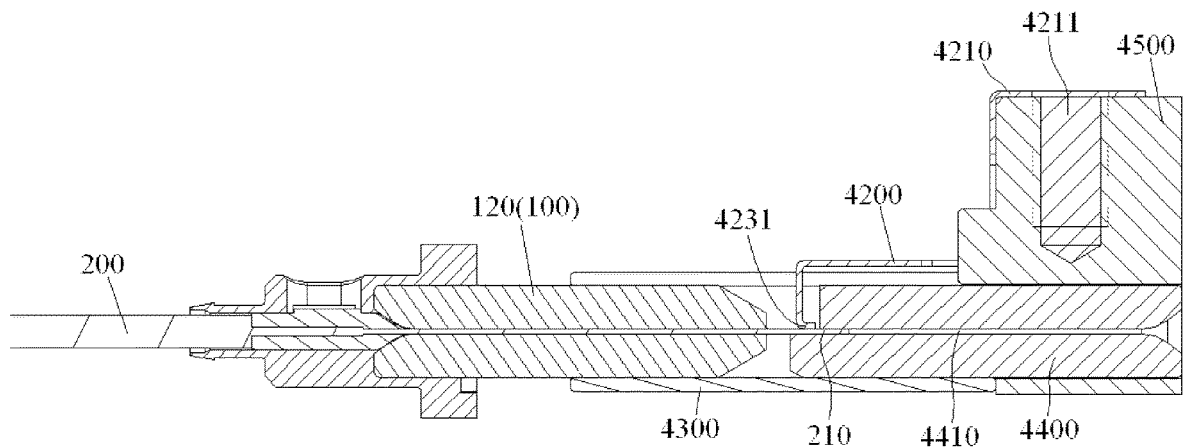
FIG. 21b is an illustrative view of inserting the front end of the ferrule assembly into the fiber alignment module of FIG. 20b, in which the fiber protruding from the front end of the ferrule assembly is inserted into an alignment groove of an alignment element and pressed in the alignment groove by a spring element.

FIG. 21a is an illustrative view of inserting the front end of the ferrule assembly 100 into the fiber alignment module of FIG. 20b, in which the fiber 210 protruding from the front end of the ferrule assembly 100 is not inserted into the alignment groove 4410 of the alignment element 4400; FIG. 21b is an illustrative view of inserting the front end of the ferrule assembly 100 into the fiber alignment module of FIG. 20b, in which the fiber 210 protruding from the front end of the ferrule assembly 100 is inserted into the alignment groove 4410 of the alignment element 4400 and pressed in the alignment groove 4410 by the spring element 4200.

As shown in FIGS. 21a and 21b, the fiber 210 protrudes from the front end of the ferrule assembly 100, and the front end of the ferrule assembly 100 is inserted into the alignment sleeve 4300 from the second end portion of the alignment sleeve 4300 until a predetermined length of the fiber 210 protruding from the front end of the ferrule assembly 100 enters into the alignment groove 4410 of the alignment element 4400. Once the front end of the ferrule assembly 100 is inserted into the alignment sleeve 4300 and the fiber 210 is inserted into the alignment groove 4410 of the alignment element 4400, the position accuracy of the fiber 210 in the fiber bore 121 of the ferrule assembly 100 is calibrated to reach position accuracy of the fiber 210 in the alignment groove 4410 of the alignment element 4400. Please be noted that, in this embodiment, the geometric center of the alignment groove 4410 is accurately positioned at an ideal center determined with reference to an inner circumferential surface of the alignment sleeve 4300, therefore, it ensures the calibrated center of the fiber 210 is accurately positioned at an ideal center determined with reference to an outer circumferential surface of the ferrule assembly 100. Herein, the term 'accurately positioned' means that an error between the actual center and the ideal center of the fiber is less than a predetermined value, for example, less than 0.0005 mm or even more less.

FIG. 22 is a principle view of adjusting an eccentricity orientation of the fiber by means of the fiber alignment module of FIG. 21b.

As shown in FIGS. 21b and 22, when the front end of the ferrule assembly 100 is inserted into the alignment sleeve 4300 and when the fiber 210 is inserted into the alignment groove 4410 of the alignment element 4400, the first end 4231 of the spring element 4200 is pressed against the fiber 210 inserted into the alignment groove 4410, so that an eccentricity orientation of a center O' of the fiber 210 with respect to a center O of the alignment element 4400 is adjusted to a predetermined orientation and held in the predetermined orientation.

As shown in FIGS. 21b and 22, the eccentricity orientation of the center O' of the fiber 210 with respect to the center O of the alignment element 4400 is adjusted to be just below the center O of the alignment element 4400.

In an exemplary embodiment of the present invention, after the center O' of the fiber 210 is adjusted to be just below the center O of the alignment element 4400, an eccentricity orientation mark is formed on an outer surface of the ferrule assembly 100 to identify the eccentricity orientation of the center O' of the fiber 210 with respect to the center O of the alignment element 4400. In an alternative embodiment, after the center O' of the fiber 210 is adjusted to be just below the center O of the alignment element 4400, an existing feature on the ferrule assembly 100 may be used as an eccentricity orientation mark to identify the eccentricity orientation of the center O' of the fiber 210 with respect to the center O of the alignment element 4400. In an exemplary embodiment of the present invention, the eccentricity orientation mark may be any mark, such as, notching mark, printing mark or any other visible mark, located on the ferrule 120 or the rear seat 110 of the ferrule assembly 100.

Figure 23:
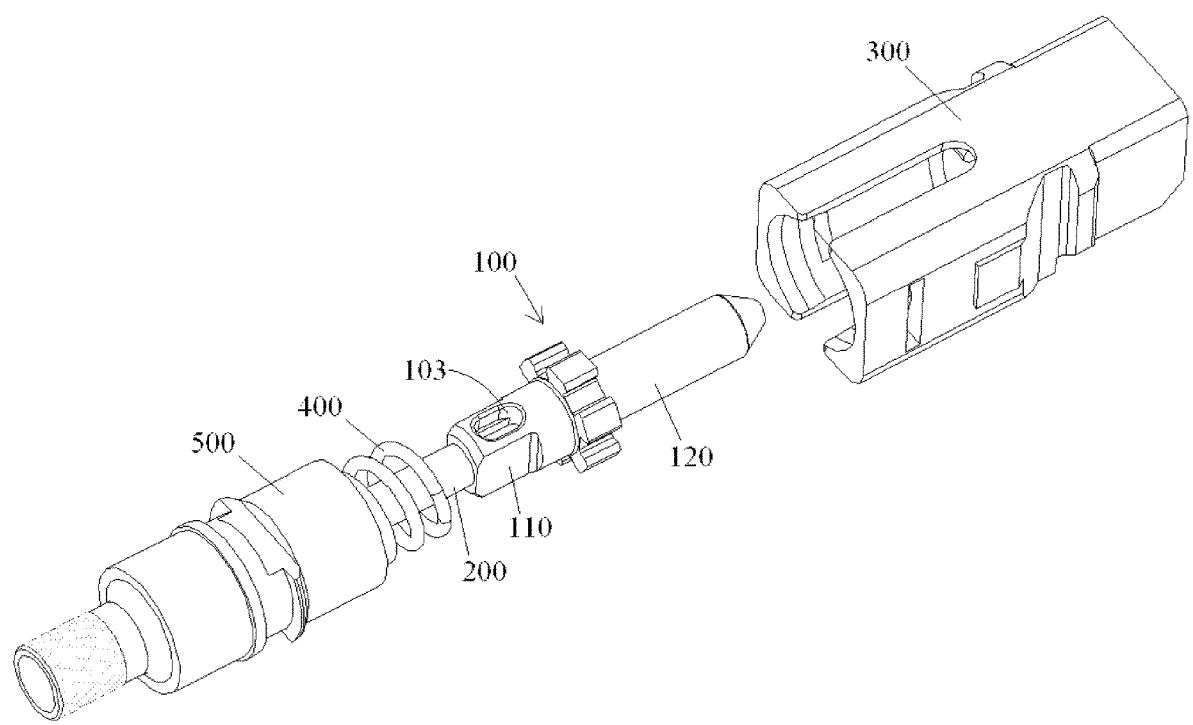
FIG. 23 is an illustrative view of inserting the ferrule assembly into a housing of a fiber optic connector in a correct orientation.

In another exemplary embodiment, as shown in FIG. 23, the injection hole 103 formed in the rear seat 110 may be served as the eccentricity orientation mark. In this way, it is no necessary to individually form an eccentricity orientation mark on the ferrule assembly 100. Referring to FIG. 23 again, in the illustrated embodiment, when the injection hole 103 is used as the eccentricity orientation mark, it is possible to determine the correct orientation, for example, an orientation when the injection hole 103 is positioned vertically upward, of the ferrule assembly 100 with respect to a housing 300 of a fiber optic connector based on the injection hole 103. In the illustrated embodiment of FIG. 23, after the ferrule assembly 100 with the optical cable 200 is inserted into the connector housing 300 based on the correct orientation, other members, such as, a spring 400, a spring seat 500, etc., of the connector may be subsequently mounted in the connector housing 300, and the fiber optic connector is assembled. Please be noted that the present invention is not limited to this, the spring 400, the spring seat 500 and the ferrule assembly 100 may be pre-assembled together to form an integral member, and then they, as the integral member, may be mounted in the connector housing 300 at one time.

In an exemplary embodiment of the present invention, after the eccentricity orientation of the center O' of the fiber 210 with respect to the center O of the alignment element 4400 is adjusted to be just below the center O of the alignment element 4400, the fiber 210 is fixed in the though hole 121 of the ferrule assembly 100 by the cured adhesive 116. In this way, the position calibration and the eccentricity orientation adjustment of the fiber 210 are finished.

Referring to FIGS. 20a-22 again, in the illustrated embodiment, the spring element 4200 is configured to be a cantilever spring piece, and the second end 4210 of the spring element 4200 is connected to the fixation block 4500 by a screw 4211. A press force F exerted on the fiber 210 by the first end 4231 of the spring element 4200 is adjusted to adapt to different diameters of fibers by controlling a distance of screwing the screw 4211 into a threaded hole 4111 in the fixation block 4500.

Although it is not shown, in another embodiment of the present invention, the eccentricity orientation of the center O' of the fiber 210 with respect to the center O of the alignment element 4400 may be controlled by the adjusting the press force F. For example, it is possible to adjust the center O' of the fiber 210 to a position just above the center O of the alignment element 4400 or just overlapping with the center O of the alignment element 4400 by adjusting the press force F.

In an exemplary embodiment of the present invention, as shown in FIGS. 20-22, a positioning slot 4221 is formed in the spring element 4200, and a protruding positioning key 4121 is formed on the fixation block 4500. The positioning key 4121 is fitted in the positioning slot 4221 to hold the position of the spring element 4200, so as to keep the position of the spring element 4200 in a direction perpendicular to the central axis of the alignment element 4400 and the press force F (a direction perpendicular to the positioning slot 4221 shown in FIG. 20a) unchanged.

Referring to FIG. 20a again, in the illustrated embodiment, the spring element 4200 comprises a first sheet portion 4230 substantially parallel to the central axis of the alignment element 4400 and a second sheet portion 4220 substantially perpendicular to and integrally connected to the first sheet like portion 4230. The positioning slot 4221 is formed in both the first sheet portion 4230 and the second sheet portion 4220. In this embodiment, the positioning slot 4221 is formed to include two portions substantially perpendicular to and communicated with each other, improving the positioning reliability and precision of the positioning slot 4221.

Referring to FIG. 20a again, in the illustrated embodiment, a notch 4330 is formed in the alignment sleeve 4300, and the first end 4231 of the spring element 4200 enters into the alignment sleeve 4300 through the notch 4330.

According to another general concept of the present invention, there is provided a method for manufacturing a fiber optic ferrule device, comprising steps of: providing a ferrule assembly; inserting a fiber into a fiber bore of the ferrule assembly until the fiber protrudes a predetermined distance from a front end of the ferrule assembly; injecting an adhesive into the ferrule assembly; sucking the adhesive from the front end of the ferrule assembly, so that the adhesive flows to the front end surface of the ferrule assembly through a gap between the fiber and the fiber bore until a predetermined sized adhesive bump is formed on the front end surface of the ferrule assembly; providing the fiber optic alignment device as mentioned in the above embodiments; inserting the front end of the ferrule assembly into the alignment sleeve of the fiber optic alignment device until a predetermined length of the fiber, protruding from the front end of the ferrule assembly, enters into the alignment groove of the alignment element; and curing the adhesive to fix the fiber in the fiber bore of the ferrule assembly.

Hereafter, it will describe a method of manufacturing a fiber optic ferrule device with reference to FIGS. 4a, 4b, 8-10 according to an exemplary embodiment of the present invention, and the method mainly comprises following steps of:

S200: providing a ferrule assembly 100 (for example, the ferrule assembly 100 shown in FIGS. 4a and 4b or FIGS. 2a-3b, 5a-7b) in which the adhesive is not filled yet;

S210: as shown in FIG. 9a, inserting a fiber 210 into the ferrule assembly 100 without the adhesive until the fiber 210 protrudes a predetermined distance from a front end surface of the ferrule assembly 100;

S220: as shown in FIG. 9b, filling the adhesive 116 into the ferrule assembly 100 through an adhesive injection hole 103 formed in an external profile surface of the ferrule assembly 100 after the fiber 210 is inserted into the ferrule assembly 100;

S230: as shown in FIGS. 8 and 9c, sucking the adhesive 116 from the front end of the ferrule assembly 100 by means of a vacuum suction device with vacuum suction nozzles 3200, so that the adhesive 116 flows to the front end surface of the ferrule assembly 100 through a gap between the fiber 210 and the fiber bore 121 until a predetermined sized adhesive bump 116a is formed on the front end surface of the ferrule assembly 100, as shown in FIG. 9d;

S240: providing a fiber optic alignment device, for example, the fiber optic alignment device shown in FIGS. 20a-21b;

S250: inserting the front end of the ferrule assembly 100 into the alignment sleeve 4300 of the fiber optic alignment device until a predetermined length of the fiber 210, protruding from the front end of the ferrule assembly 100, enters into the alignment groove 4410 of the alignment element 4400; and S260: curing the adhesive 116 to fix the fiber 210 in the fiber bore 121 of the ferrule assembly 100.

According to another exemplary embodiment of the present invention, there is provided a fiber optic ferrule device comprising a ferrule assembly 100 and a fiber 210 fixed in a fiber bore 121 of the ferrule assembly 100, and the fiber optic ferrule device is manufactured by the above method.

According to still another general concept of the present invention, there is provided an apparatus for manufacturing a fiber optic ferrule device, wherein the fiber optic ferrule device comprises a ferrule assembly and an optical cable, a fiber bared from an end of the optical cable is inserted into a fiber bore of the ferrule assembly and protrudes from a front end of the ferrule assembly. The apparatus comprising: a ferrule clamping module configured to clamp and position a plurality of ferrule assemblies; a fiber/cable clamping module adapted to be engaged to a rear side of the ferrule clamping module, and configured to clamp and position a section of the respective optical cable behind the ferrule clamping module; a vacuum suction module adapted to be engaged to a front side of the ferrule clamping module, and configured to suck an adhesive filled in the respective ferrule assembly from the front end of the ferrule assembly, so that the adhesive flows to a front end surface of the ferrule assembly through a gap between the fiber and the fiber bore until a predetermined size of adhesive bump is formed on the front end surface of the ferrule assembly; and a fiber alignment module adapted to be engaged to the front side of the ferrule clamping module, and configured to calibrate position accuracy of the respective fiber inserted into the fiber bore of the respective ferrule assembly and adjust an eccentricity orientation of the center of the respective fiber to a predetermined orientation. The adhesive is injected into the ferrule assembly after the fiber is inserted into the fiber bore of the ferrule assembly. When the predetermined size of adhesive bump is formed on the front end surface of the ferrule assembly, the vacuum suction module is removed from the ferrule clamping module, and the fiber alignment module is engaged to the ferrule clamping module.

Figure 12:
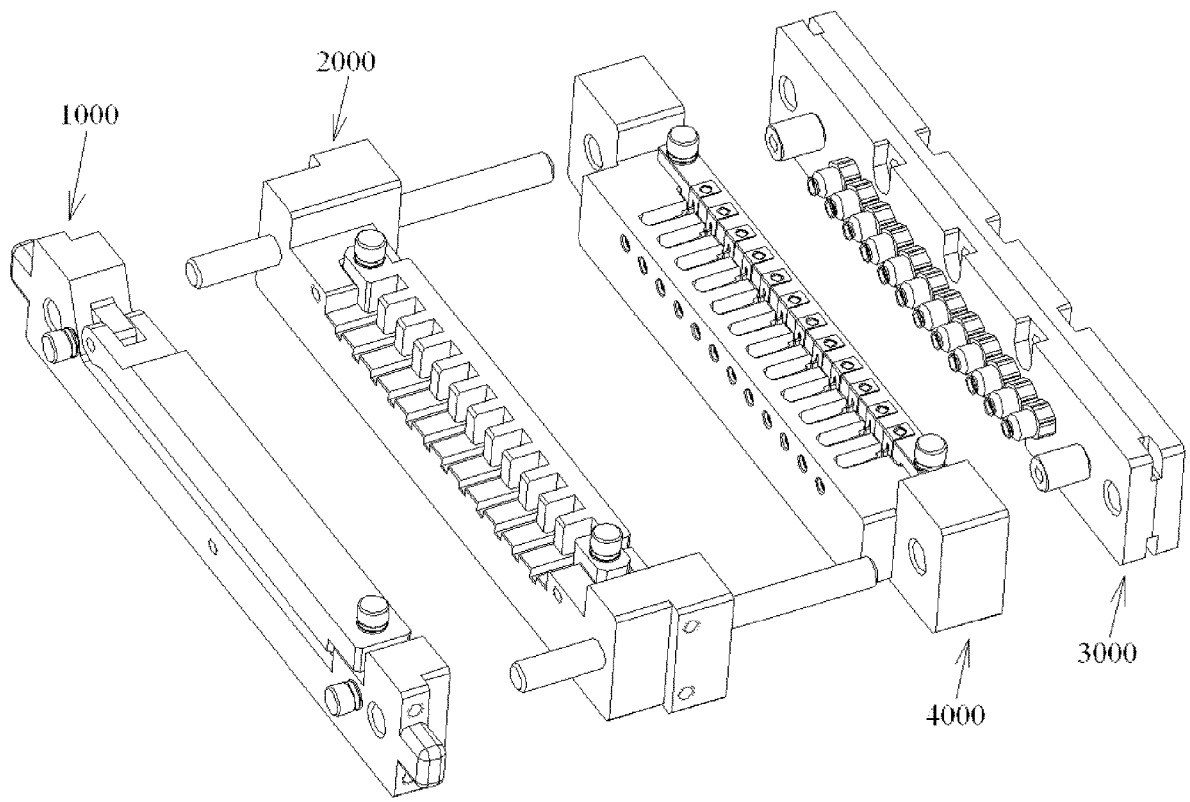
FIG. 12 is an illustrative exploded view of an apparatus for manufacturing the ferrule assembly according to an exemplary embodiment of the present invention.

FIG. 12 is an illustrative exploded view of an apparatus for manufacturing a ferrule assembly 100 according to an exemplary embodiment of the present invention.

As shown in FIG. 12, in the illustrated embodiment, the apparatus for manufacturing the fiber optic ferrule device mainly comprises a fiber/cable clamping module 1000, a ferrule clamping module 2000, a vacuum suction module 3000 and a fiber alignment module 4000.

Figure 13A:
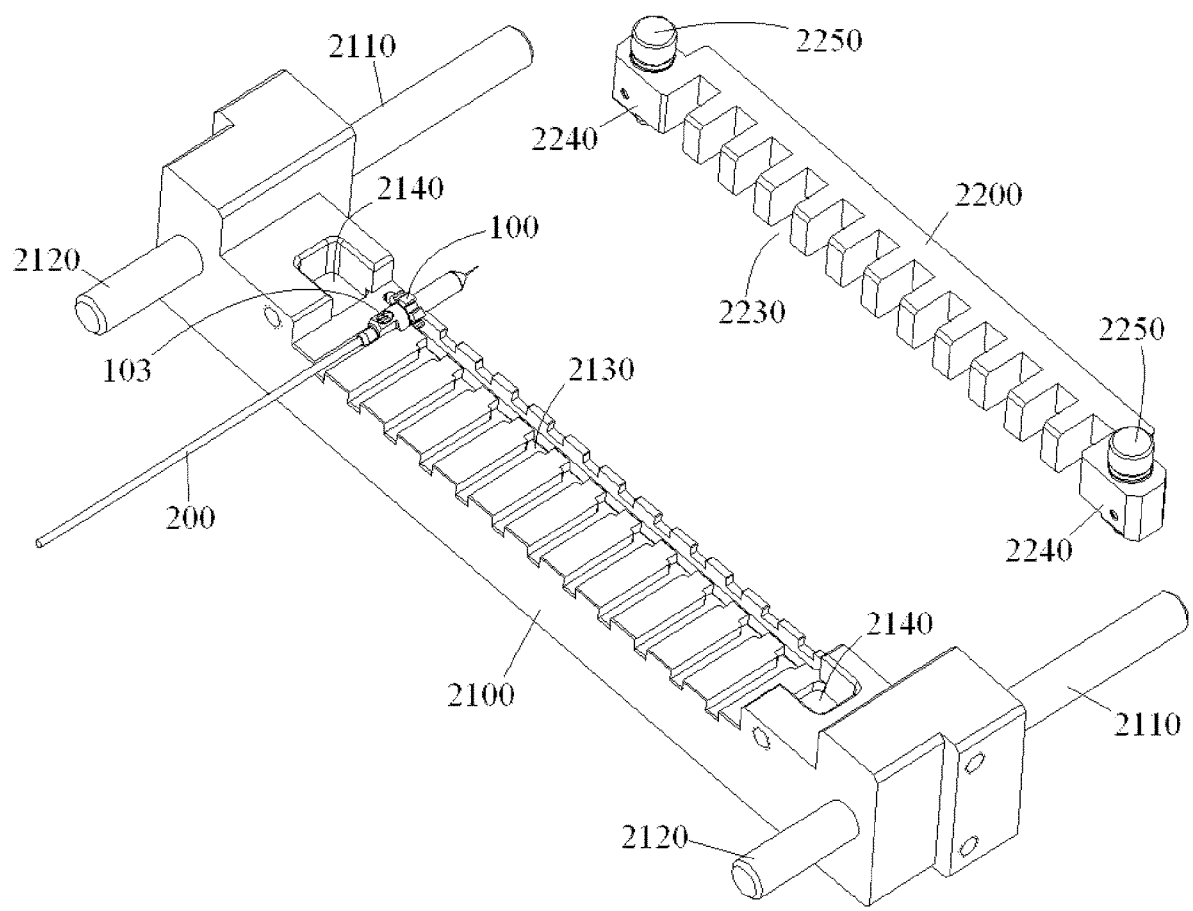
FIG. 13a is an illustrative exploded view of a ferrule clamping module shown in FIG. 12.
Figure 13B:
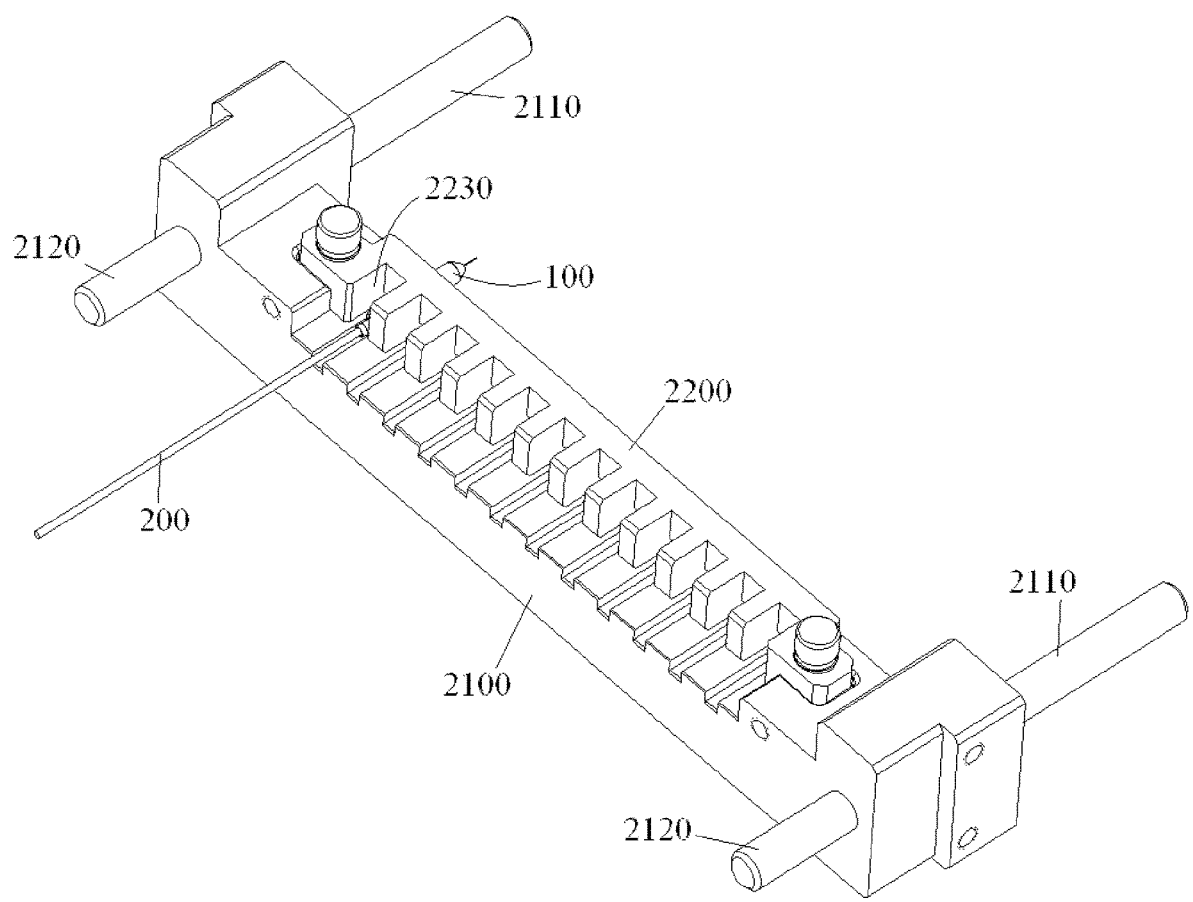
FIG. 13b is an illustrative assembled view of the ferrule clamping module shown in FIG. 12.

FIG. 13a is an illustrative exploded view of a ferrule clamping module 2000 shown in FIG. 12; FIG. 13b is an illustrative assembled view of the ferrule clamping module 2000 shown in FIG. 12.

As shown in FIGS. 12 and 13, the ferrule clamping module 2000 is configured to clamp and position a plurality of ferrule assemblies 100.

In an exemplary embodiment of the present invention, as shown in FIGS. 12, 13a and 13b, the ferrule clamping module 2000 mainly comprises a bottom seat 2100 and a press block 2200. A row of positioning slots 2130 are formed on the bottom seat 2100 to position the plurality of ferrule assemblies 100, and front alignment pins 2110 and rear alignment pins 2120 are provided at front and rear sides of both ends of bottom seat 2100, respectively. The press block 2200 is adapted to be mounted on the bottom seat 2100. As shown in FIG. 13b, when the press block 2200 is assembled on the bottom seat 2100, the ferrule assemblies 100 positioned in the positioning slots 2130 is clamped and held between the bottom seat 2100 and the press block 2200.

As shown in FIGS. 12, 13a and 13b, in the illustrated embodiment, recesses 2140, matched with both end portions 2240 of the press block 2200, are formed in the bottom seat 2100. The end portions 2240 of the press block 2200 are fitted in the recesses 2140 of the bottom seat 2100.

As shown in FIGS. 13a and 13b, in an embodiment, an injection hole 103, for injecting the adhesive 116 into the respective ferrule assembly 100, is formed in an external profile surface of the ferrule assembly 100 and communicated with the fiber bore 121 of the ferrule assembly 100. The injection hole 103 is positioned upward as the ferrule assembly 100 is clamped and positioned by the ferrule clamping module 2000. A plurality of notches 2230, corresponding to injection holes 103 of the ferrule assemblies 100, respectively, are formed in the press block 2200. The adhesive 116 is injected into the ferrule assembly 100 by an adhesive injection needle (not shown) inserted into the injection hole 103 through the notch 2230 (see FIG. 9b).

Figure 14:
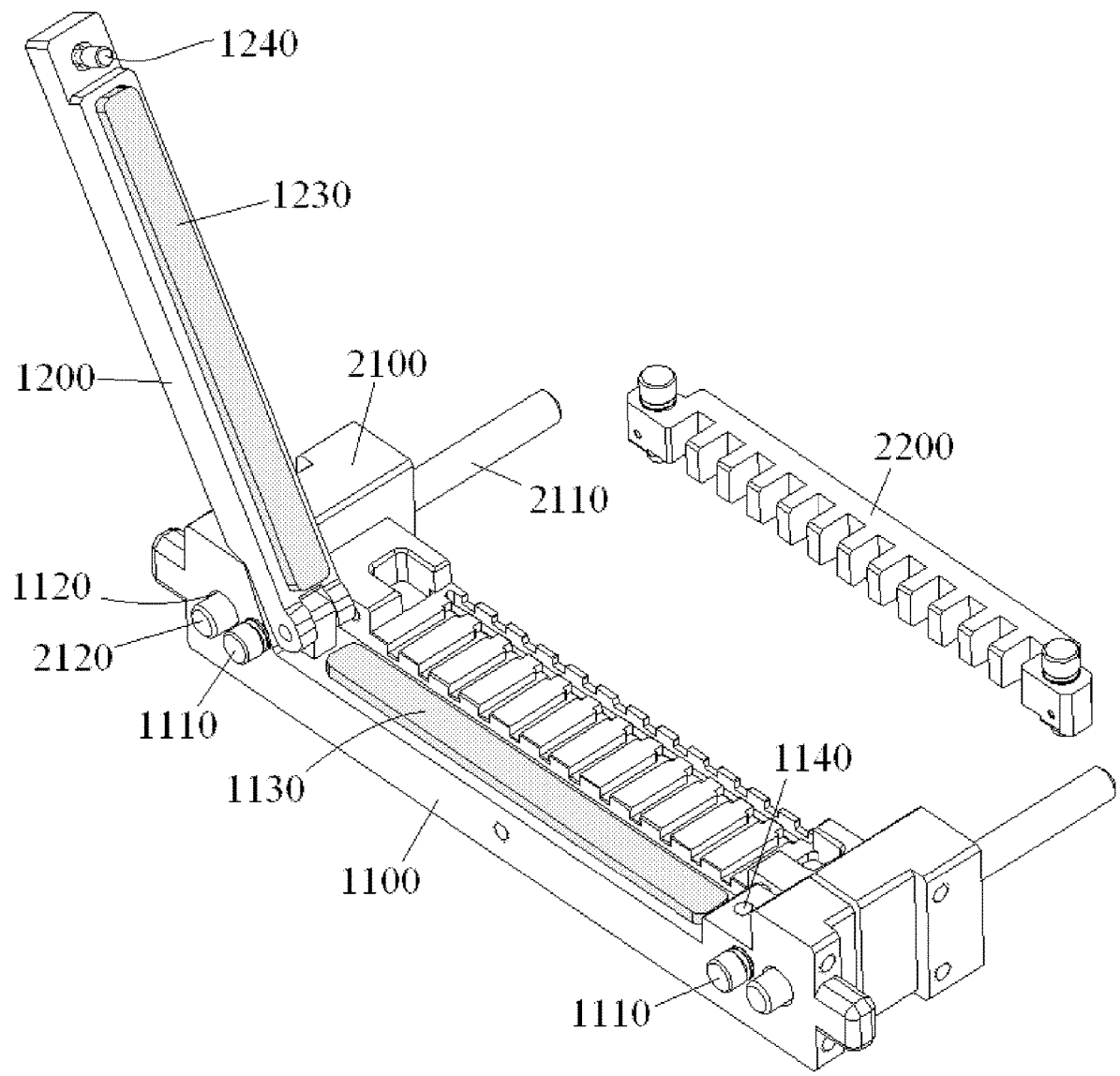
FIG. 14 is an illustrative view of a fiber/cable clamping module shown in FIG. 12.

FIG. 14 is an illustrative view of a fiber/cable clamping module 1000 shown in FIG. 12.

Figure 15A:
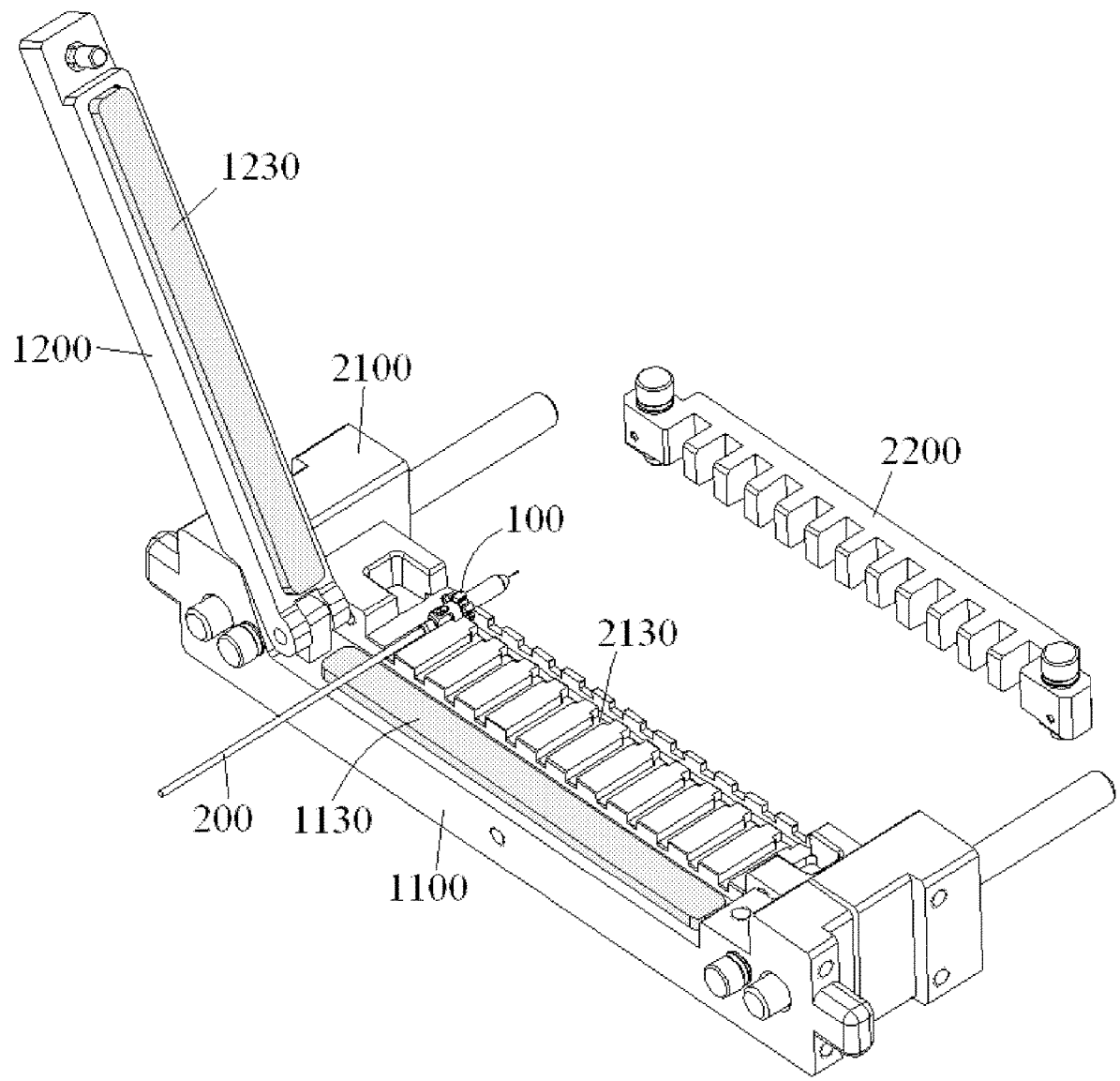
FIG. 15a is an illustrative view of assembling the fiber/cable clamping module and the ferrule clamping module of FIG. 12, in which a press plate of the fiber/cable clamping module is opened, a press block of the ferrule clamping module is detached from a bottom seat of the press block, and the ferrule is positioned in a positioning slot of the ferrule clamping module.
Figure 15B:
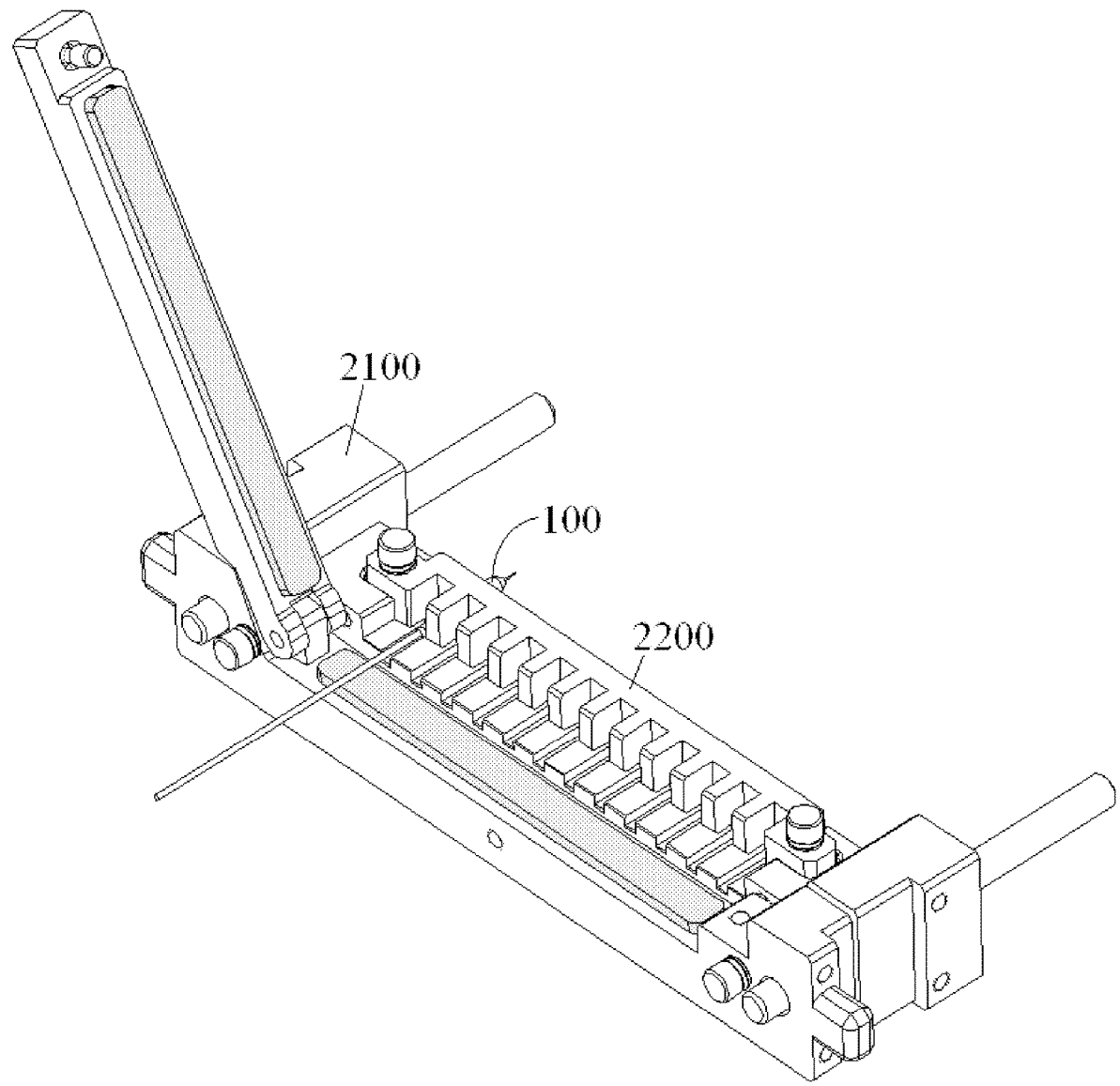
FIG. 15b shows the fiber/cable clamping module and the ferrule clamping module of FIG. 15a, in which the press block of the ferrule clamping module is assembled to the bottom seat, and the ferrule is clamped and fixed between the bottom seat and the press block.
Figure 15C:
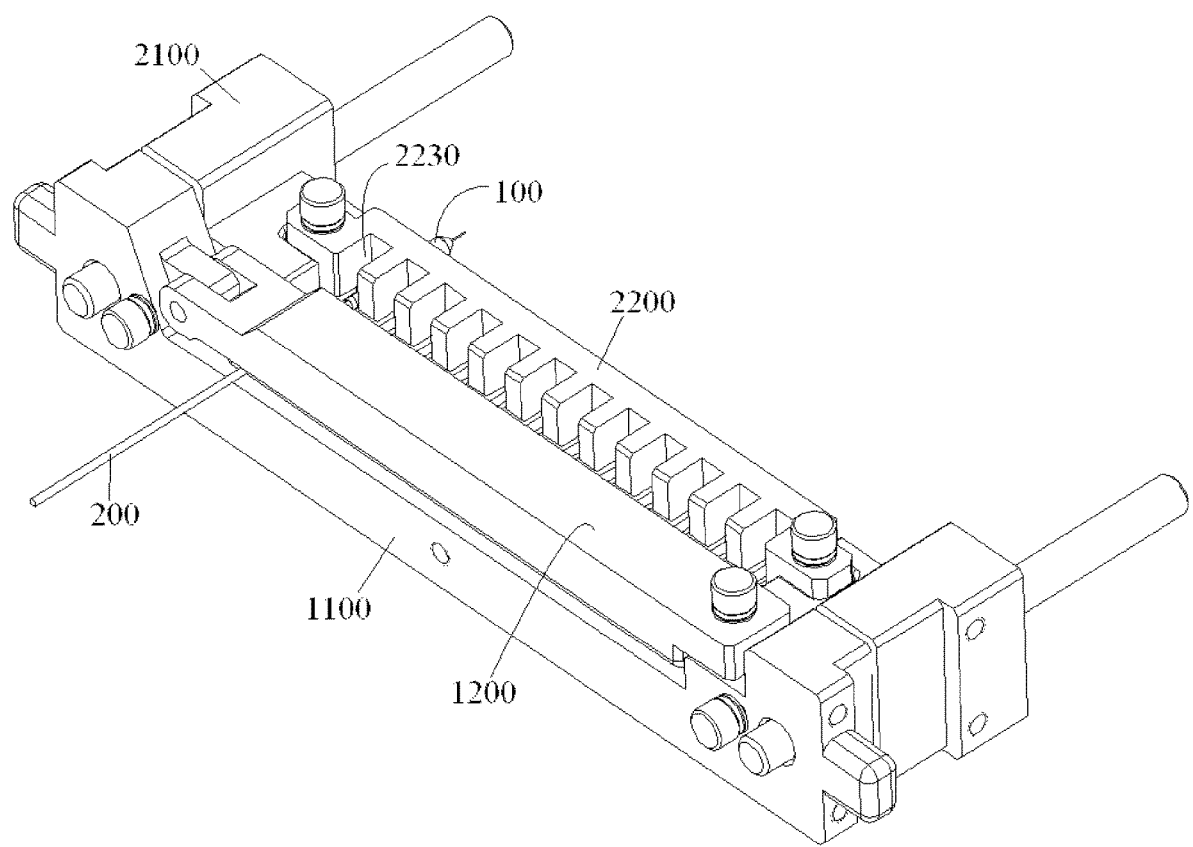
FIG. 15c shows the fiber/cable clamping module and the ferrule clamping module of FIG. 15b, in which the press plate of the fiber/cable clamping module is closed on a base seat, the fiber of the optical cable is inserted into the ferrule, and the optical cable is clamped and fixed between the base seat and the press plate.

As shown in FIGS. 12 and 14, in an embodiment of the present invention, the fiber/cable clamping module 1000 is adapted to be engaged to a rear side of the ferrule clamping module 2000, and configured to clamp and position a section of the respective optical cable 200 behind the ferrule clamping module 2000 (see FIG. 15c).

In the illustrated embodiment, as shown in FIGS. 12 and 14, the fiber/cable clamping module 1000 mainly comprises a base seat 1100 and a press plate 1200. Alignment holes 1120, for matching with the rear alignment pins 2120 of the ferrule clamping module 2000, are formed in both ends of the base seat 1100, respectively. The press plate 1200 is adapted to be mounted on the base seat 1100. When the press plate 1200 is assembled on the base seat 1100, the optical cable 200 inserted into the ferrule assembly 100 is clamped and held between the base seat 1100 and the press plate 1200 (see FIG. 15c).

As shown in FIGS. 12, 14 and 15a-15c, in an embodiment of the present invention, a first elastic soft pad 1130 is provided on a top surface of the base seat 1100, and a second elastic soft pad 1230 is provided on a bottom surface of the press plate 1200. The optical cable 200 is clamped and held between the first elastic soft pad 1130 and the second elastic soft pad 1230. In this way, it may protect the fiber of the optical cable 200 from being crushed.

As shown in FIG. 14, in the illustrated embodiment, a first end of the press plate 1200 is rotatably connected to the base seat 1100, and a second end of the press plate 1200 is mounted on the base seat 1100 in a pin-hole matching manner. For example, referring to FIG. 14, a positioning pin 1240 is provided on the second end of the press plate 1200, and a positioning hole 1140 for matching with the positioning pin 1240 is formed in the base seat 1100. The second end of the press plate 1200 is mounted on the base seat 1100 by fitting the positioning pin 1240 into the positioning hole 1140.

Hereafter, it will describe operations of fixing the ferrule assembly 100 on the ferrule clamping module 2000 and fixing the optical cable 200 that has been inserted into the ferrule assembly 100 on the fiber/cable clamping module 1000 with reference to FIGS. 14, 15a, 15b and 15c.

Firstly, as shown in FIGS. 14 and 15a, inserting the rear alignment pin 2120 of the ferrule clamping module 2000 into the alignment hole 1120 of the fiber/cable clamping module 1000, and engaging the fiber/cable clamping module 1000 to the ferrule clamping module 2000. At this time, the press plate 1200 of the fiber/cable clamping module 1000 is opened, the press block 2200 of the ferrule clamping module 2000 is detached from the bottom seat 2100, and the ferrule assembly 100 is positioned in the positioning slots 2130 of the ferrule clamping module 2000.

Then, as shown in FIG. 15b, assembling the press block 2200 of the ferrule clamping module 2000 on the bottom seat 2100, so as to clamp and hold the ferrule assembly 100 between the bottom seat 2100 and the press block 2200.

Finally, as shown in FIG. 15c, laying down the press plate 1200 of the fiber/cable clamping module 1000 on the base seat 1100, so as to clamp and hold the optical cable 200, that has been inserted into the ferrule assembly 100, between the base seat 1100 and the press plate 1200.

In this way, the ferrule assembly 100 is held on the ferrule clamping module 2000, and the optical cable 200, that has been inserted into the ferrule assembly 100, is held on the fiber/cable clamping module 1000.

In the illustrated embodiment, the ferrule clamping module 2000 has twelve ferrule positioning slots 2130, and twelve ferrule assemblies 100 may be positioned at one time, or, in other words, twelve ferrule assemblies (fiber optic ferrule device) 100 may be manufactured at one time. But the present invention is not limited to this, the ferrule clamping module 2000 may have more or less ferrule positioning slots 2130, for example, the ferrule clamping module 2000 may have twenty or more ferrule positioning slots 2130.

Figure 16A:
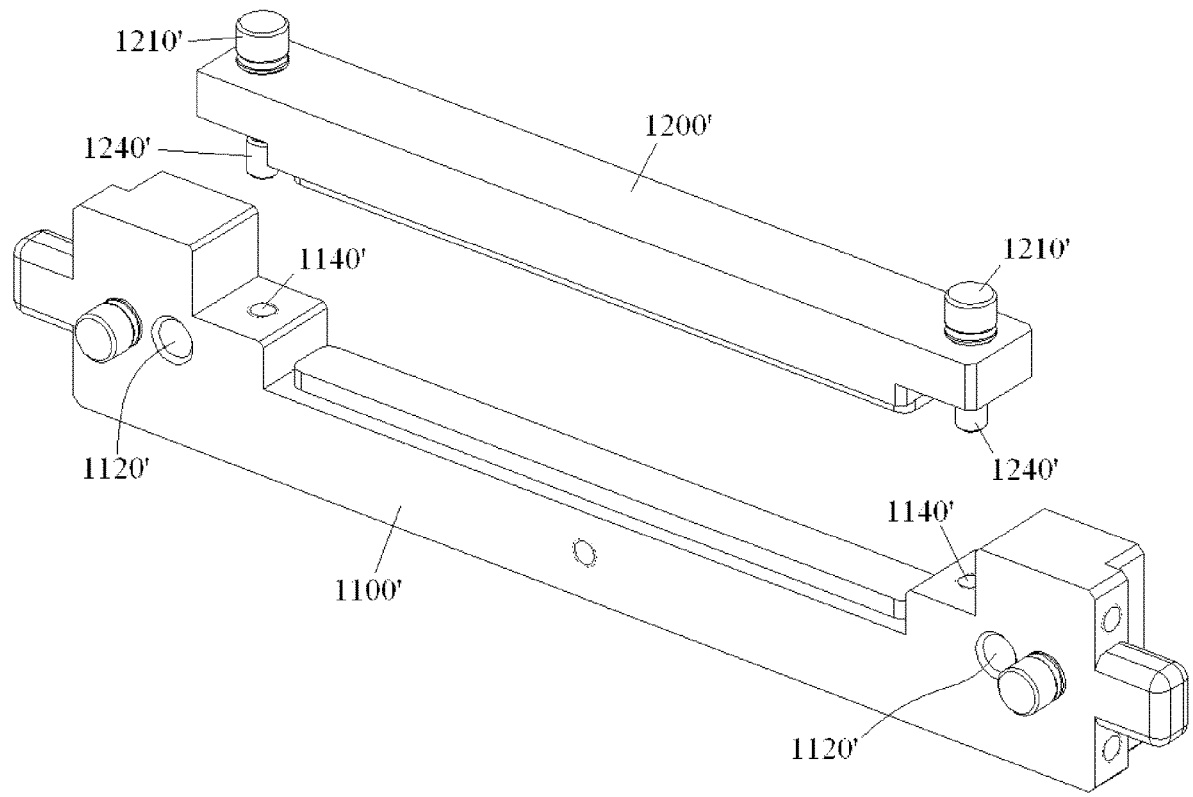
FIG. 16a is an illustrative view of a fiber/cable clamping module according to another exemplary embodiment, in which a press plate of the fiber/cable clamping module is detached from the base seat.
Figure 16B:
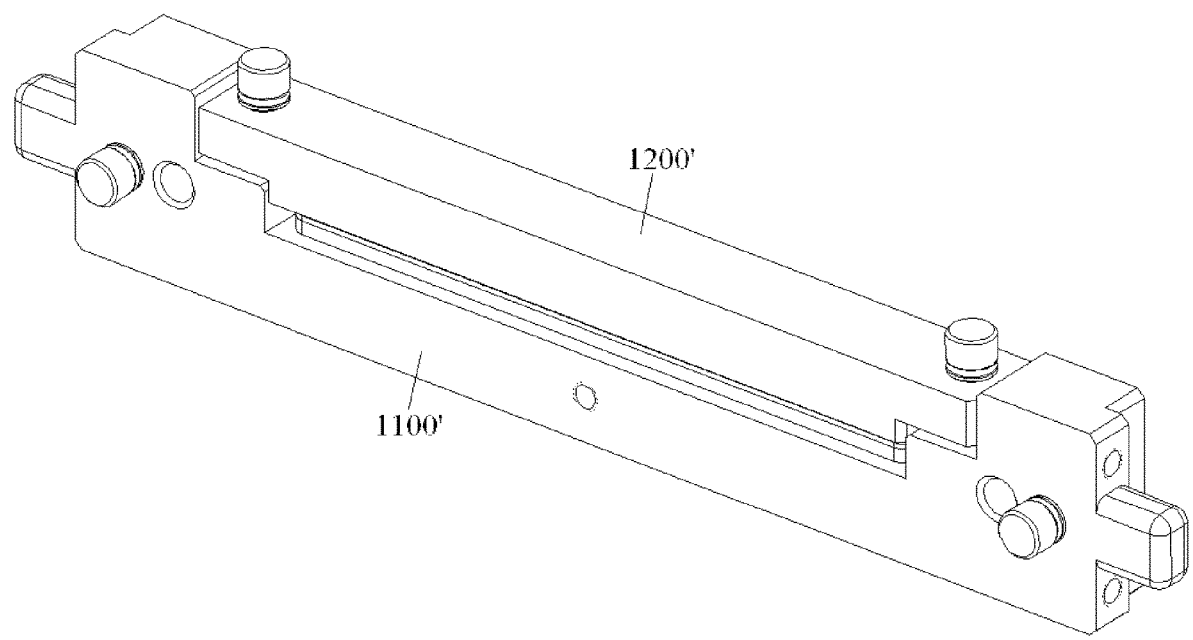
FIG. 16b shows the fiber/cable clamping module of FIG. 16a, in which a press plate of the fiber/cable clamping module is assembled to the base seat.

FIG. 16a is an illustrative view of a fiber/cable clamping module 1000' according to another exemplary embodiment, in which a press plate 1200' of the fiber/cable clamping module 1000' is detached from the base seat 1100'; FIG. 16b shows the fiber/cable clamping module 1000' of FIG. 16a, in which the press plate 1200' of the fiber/cable clamping module 1000' is assembled to the base seat 1100'.

As shown in FIGS. 16a and 16b, in an exemplary embodiment of the present invention, the press plate 1200' is adapted to be mounted on the base seat 1100' in a pin-hole matching manner.

In the illustrated embodiment, as shown in FIGS. 16a and 16b, a positioning pin 1240' is provided on each end of the press plate 1200', and a positioning hole 1140' for matching with the positioning pin 1240' is formed in each end of the base seat 1100'. The press plate 1200' is mounted on the base seat 1100' by fitting the positioning pin 1240' into the positioning hole 1140'.

Figure 17A:
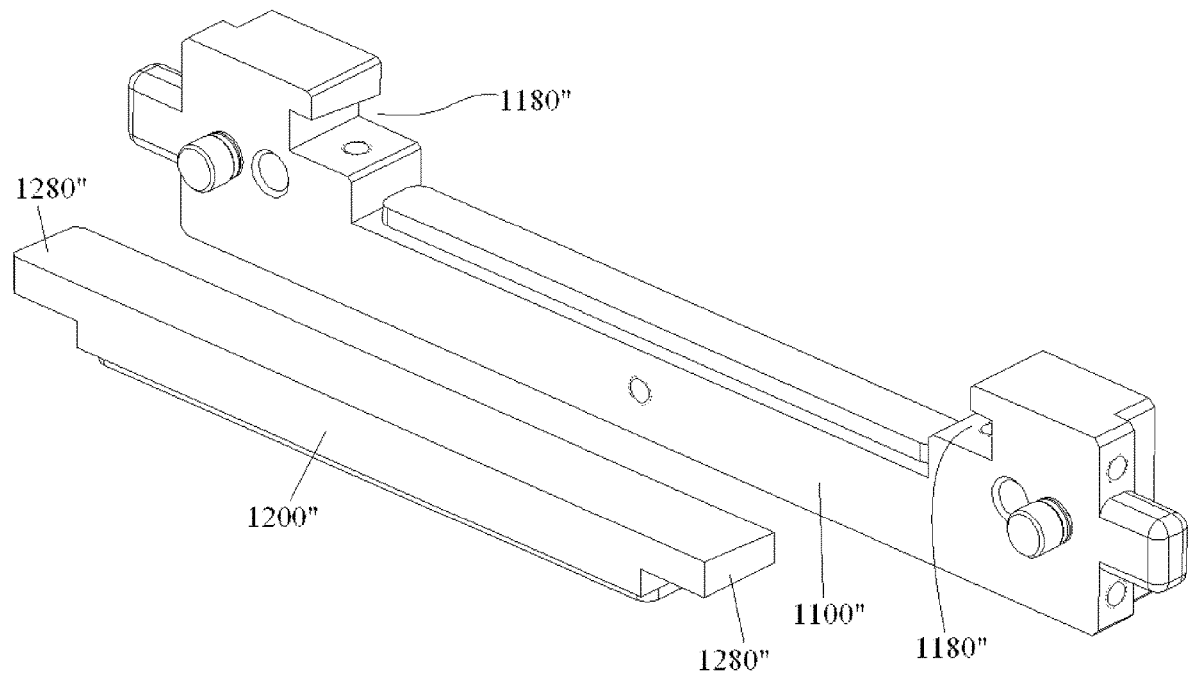
FIG. 17a is an illustrative view of a fiber/cable clamping module according to yet another exemplary embodiment, in which a press plate of the fiber/cable clamping module is detached from the base seat.
Figure 17B:
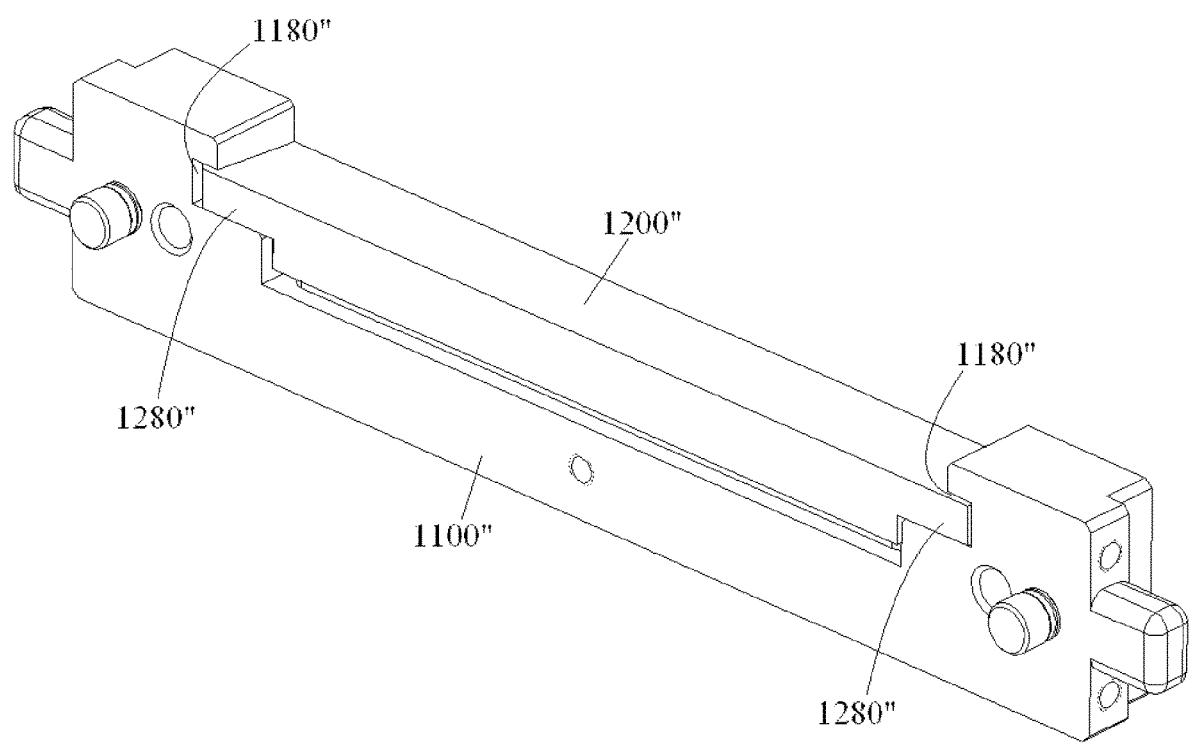
FIG. 17b shows the fiber/cable clamping module of FIG. 17a, in which the press plate of the fiber/cable clamping module is assembled to the base seat.

FIG. 17a is an illustrative view of a fiber/cable clamping module 1000" according to yet another exemplary embodiment, in which a press plate 1200" of the fiber/cable clamping module 1000" is detached from the base seat 1100"; FIG. 17b shows the fiber/cable clamping module 1000" of FIG. 17a, in which the press plate 1200" of the fiber/cable clamping module 1000" is assembled to the base seat 1100".

As shown in FIGS. 17a and 17b, in an exemplary embodiment of the present invention, the press plate 1200" is adapted to be mounted on the base seat 1100" in a plugging manner.

In the illustrated embodiment, as shown in FIGS. 17a and 17b, a tapered positioning portion 1280" is formed on each end of the press plate 1200", and a tapered positioning slot 1180" for matching with the tapered positioning portion 1280" is formed in the base seat 1100". The press plate 1200" is mounted on the base seat 1100" by plugging the tapered positioning portion 1280" into the tapered positioning slot 1180".

Figure 18A:
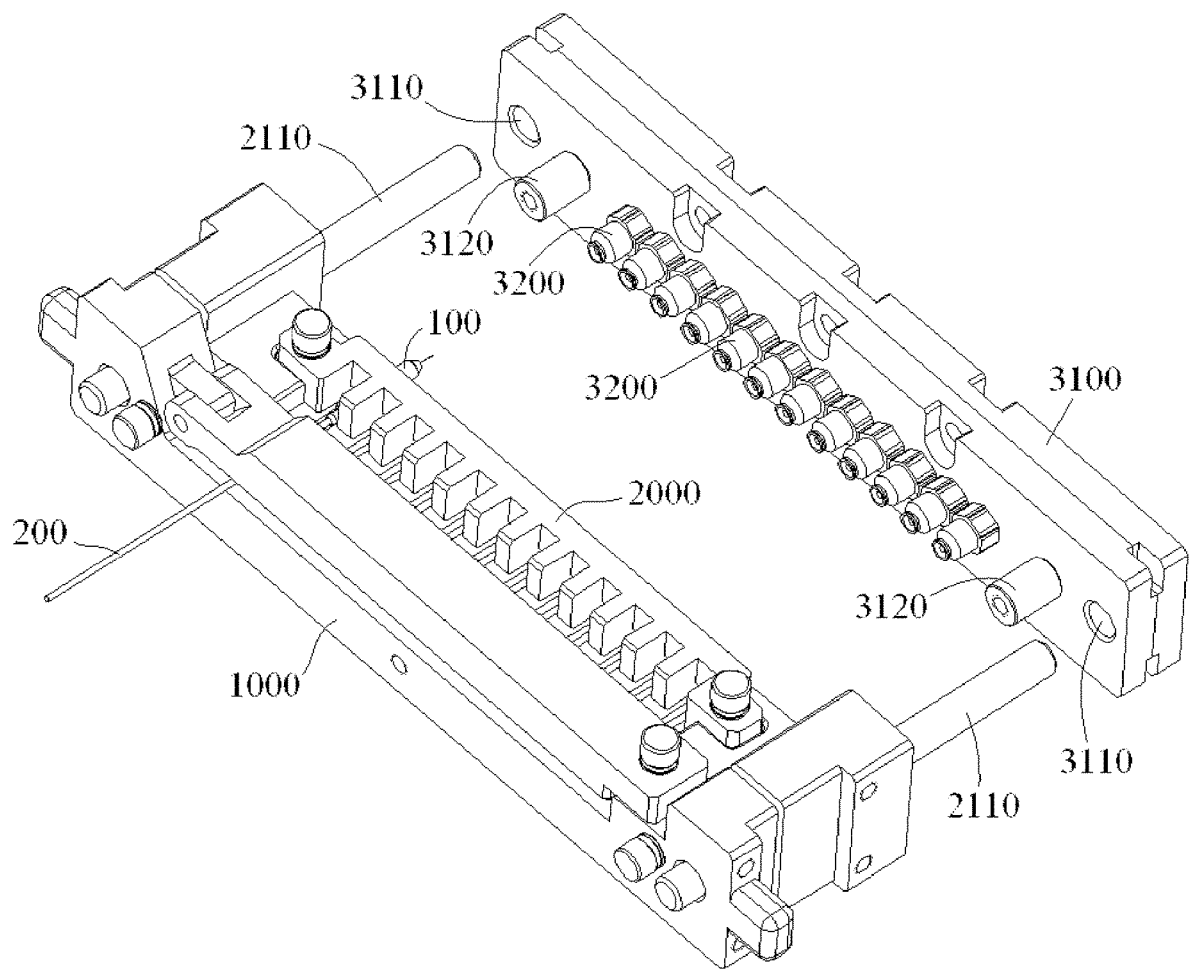
FIG. 18a shows the vacuum suction module, the fiber/cable clamping module and the ferrule clamping module of FIG. 12, in which the vacuum suction module is separated from the ferrule clamping module.
Figure 18B:
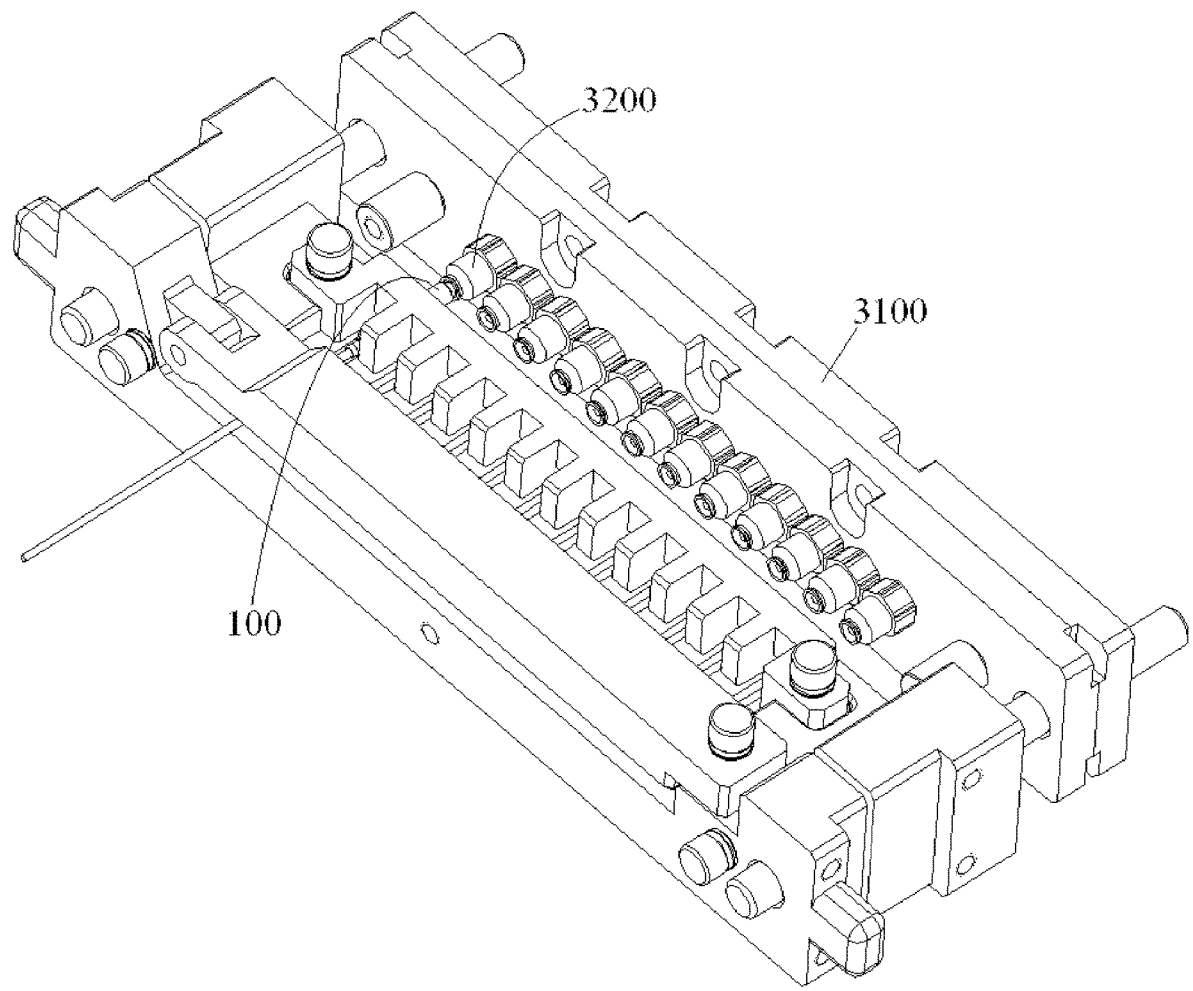
FIG. 18b shows the vacuum suction module, the fiber/cable clamping module and the ferrule clamping module of FIG. 18a, in which the vacuum suction module is engaged to the ferrule clamping module, and a vacuum suction nozzle is sucked to the front end of the respective ferrule assembly clamped by the ferrule clamping module.

FIG. 18a shows the vacuum suction module 3000, the fiber/cable clamping module 1000 and the ferrule clamping module 2000 of FIG. 12, in which the vacuum suction module 3000 is separated from the ferrule clamping module 2000; FIG. 18b shows the vacuum suction module 3000, the fiber/cable clamping module 1000 and the ferrule clamping module 2000 of FIG. 18a, in which the vacuum suction module 3000 is engaged to the ferrule clamping module 2000, and a vacuum suction nozzle 3200 is sucked to the front end of the respective ferrule assembly 100 clamped by the ferrule clamping module 2000.

As shown in FIGS. 18a and 18b, in the illustrated embodiment, the vacuum suction module 3000 is adapted to be engaged to a front side of the ferrule clamping module 2000, and configured to suck an adhesive 116 filled in the respective ferrule assembly 100 from the front end of the ferrule assembly 100, so that the adhesive 116 flows to a front end surface of the ferrule assembly 100 through a gap between the fiber 210 and the fiber bore 121 until a predetermined size of adhesive bump 116a is formed on the front end surface of the ferrule assembly 100.

In an embodiment of the present invention, as shown in FIGS. 18a and 18b, the vacuum suction module 3000 mainly comprises a fixation frame 3100, a row of vacuum suction nozzles 3200 mounted on the fixation frame 3100 and a vacuum generator connected to the vacuum suction nozzles 3200 (see FIG. 11).

As described above, as shown in FIGS. 8 and 11, the vacuum suction nozzle 3200 is connected to the vacuum suction port of the vacuum generator through a connection pipe 3300.

In an embodiment of the present invention, alignment holes 3110, for matching with the front alignment pins 2110 of the ferrule clamping module 2000, are formed on both ends of the fixation frame 3100, respectively. The row of vacuum suction nozzles 3200 are fixed on the fixation frame 3100, and each of the vacuum suction nozzles 3200 is adapted to be hermetically sucked on the front end of the respective ferrule assembly 100.

As shown in FIGS. 18*a* and 18*b*, the ferrule clamping module 2000 may be accurately engaged to the vacuum suction module 3000 simply by inserting the front alignment pin 2110 of the ferrule clamping module 2000 into the alignment hole 3110 of the vacuum suction module 3000. After the ferrule clamping module 2000 is engaged to the vacuum suction module 3000, the vacuum suction nozzles 3200 of the vacuum suction module 3000 are aligned to the front ends of the respective ferrule assemblies 100 fixed on the ferrule clamping module 2000, so as to be sucked on the front end of the respective ferrule assemblies 100.

As shown in FIGS. 18*a* and 18*b*, in an embodiment of the present invention, a space control member 3120 is provided on a rear side of each end of the fixation frame 3100, so as to control a space between the fixation frame 3100 and the ferrule clamping module 2000 and limit a length of the ferrule assembly 100 sucked into the vacuum suction nozzle 3200. In this way, it may prevent the ferrule assembly 100 from being excessively sucked into the vacuum suction nozzle 3200. If the ferrule assembly 100 is excessively sucked into the vacuum suction nozzle 3200, the fiber 210 protruding from the front end of the ferrule assembly 100 may be damaged, or even the front end surface of the ferrule assembly 100 is ruined.

In an embodiment of the present invention, as described above, as shown in FIGS. 8 and 9*c*, the vacuum suction module 3000 is configured to suck the adhesive 116 filled in the respective ferrule assembly 100 from the front end of the ferrule assembly 100, so that the adhesive 116 flows to the front end surface of the ferrule assembly 100 through a gap between the fiber 210 and the fiber bore 121 until a predetermined size of adhesive bump 116*a* is formed on the front end surface of the ferrule assembly 100, as shown in FIG. 9*d*.

As described above, as shown in FIG. 10, in an exemplary embodiment of the present invention, the size of the adhesive bump 116*a* formed on the front end surface of the ferrule assembly 100 is identified by a visual recognition device (not shown). For instance, the visual recognition device is configured to capture an image of the adhesive bump 116*a* formed on the front end surface of the ferrule assembly 100 by a camera, and process and identify the captured image, so as to determine the size and/or shape of the adhesive bump 116*a* formed on the front end surface of the ferrule assembly 100.

In above embodiments of the present invention, after the adhesive is fully filled in the gap between the fiber 210 and the fiber bore 121 of the ferrule assembly 100, the fiber 210 protruding from the front end surface of the ferrule assembly 100 is clean because the fiber 210 is inserted into the fiber bore 121 before filling the adhesive. As a result, there is no adhesive adhered on the fiber 210 protruding from the front end surface of the ferrule assembly 100, ensuring the optical property of the fiber 210.

As described above, as shown in FIG. 11, the vacuum suction device 3000 further comprises a pressure regulating valve connected to an inlet port of the vacuum generator, so as to adjust an inlet pressure of the vacuum generator.

As described above, referring to FIGS. 9*c* and 11 again, the vacuum suction device 3000 further comprises a pressure sensor provided on the connection pipe 3300 between the vacuum suction nozzle 3200 and the vacuum suction port of the vacuum generator, to sense a negative pressure value in the connection pipe 3300. In this way, it is possible to determine whether the vacuum suction nozzle 3200 is hermetically sucked on the front end of the ferrule assembly 100 based on the negative pressure value sensed by the pressure sensor. If the vacuum suction nozzle 3200 is not hermetically sucked on the front end of the ferrule assembly 100, air leakage is present, and the negative pressure value sensed by the pressure sensor cannot reach a predetermined value. Thereby, on one hand, if the negative pressure value sensed by the pressure sensor is less than the predetermined value, it may directly determine that air leakage is present. On the other hand, if the negative pressure value sensed by the pressure sensor is equal to or higher than the predetermined value, it may directly determine that air leakage is not present.

As described above, referring to FIGS. 9*c* and 11 again, in the illustrated embodiment, the vacuum suction device 3000 further comprises a vacuum filter provided in the connection pipe 3300 between the vacuum suction nozzle 3200 and the vacuum suction port of the vacuum generator. The vacuum filter is used to filter impurities from the air, so as to protect the vacuum generator from the impurities.

As described above, referring to FIGS. 10 and 11, in an exemplary embodiment of the present invention, a controller (not shown) is provided to control the vacuum generator to generate a failure pressure, so that the vacuum suction nozzle 3200 is released from the ferrule assembly 100 once the size and/or shape of the adhesive bump 116*a* formed on the front end surface of the ferrule assembly 100 identified by the visual recognition device reaches the predetermined size and/or shape.

Figure 19A:
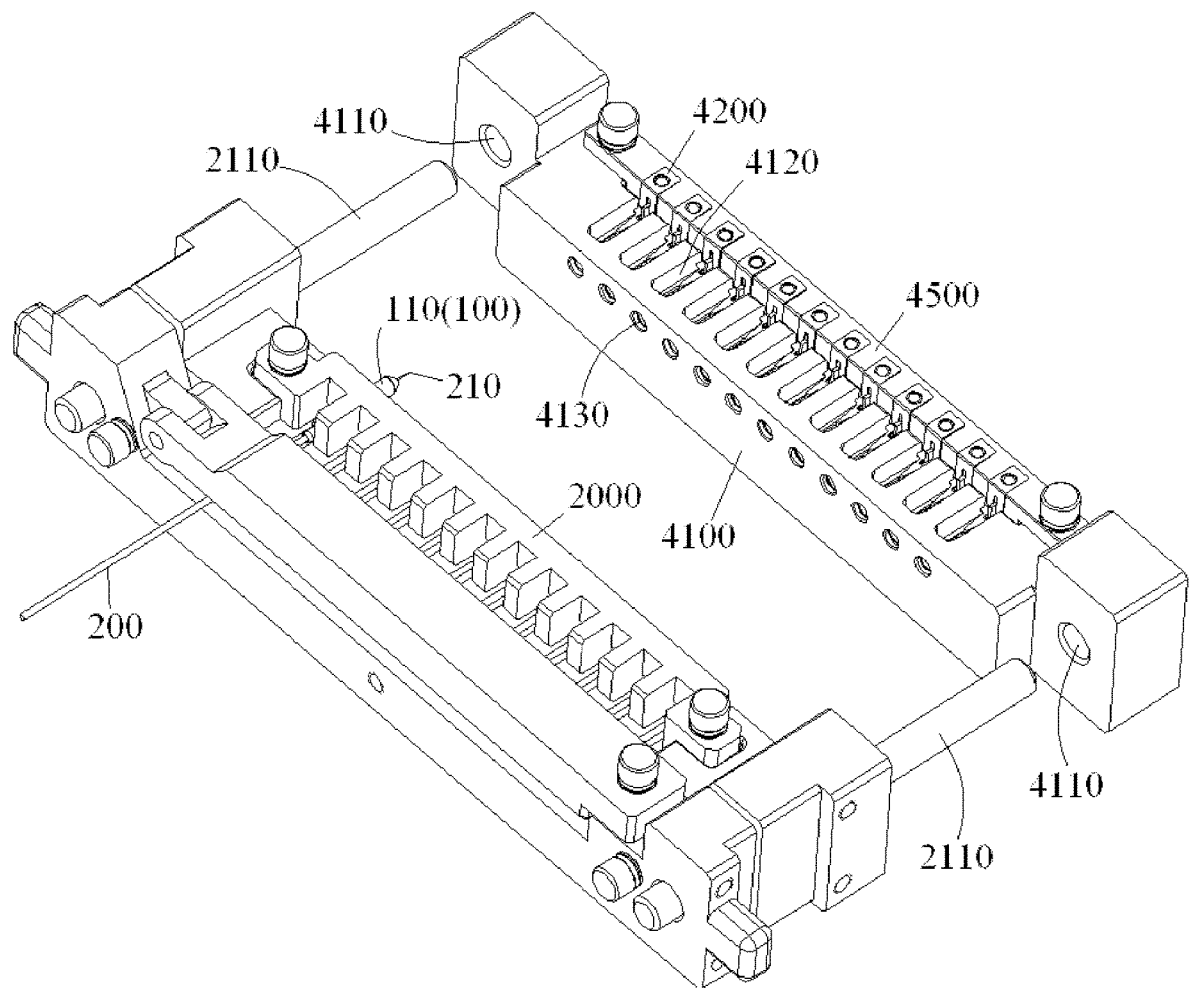
FIG. 19a shows a fiber alignment module, the fiber/cable clamping module and the ferrule clamping module of FIG. 12, in which the fiber alignment module is separated from the ferrule clamping module.
Figure 19B:
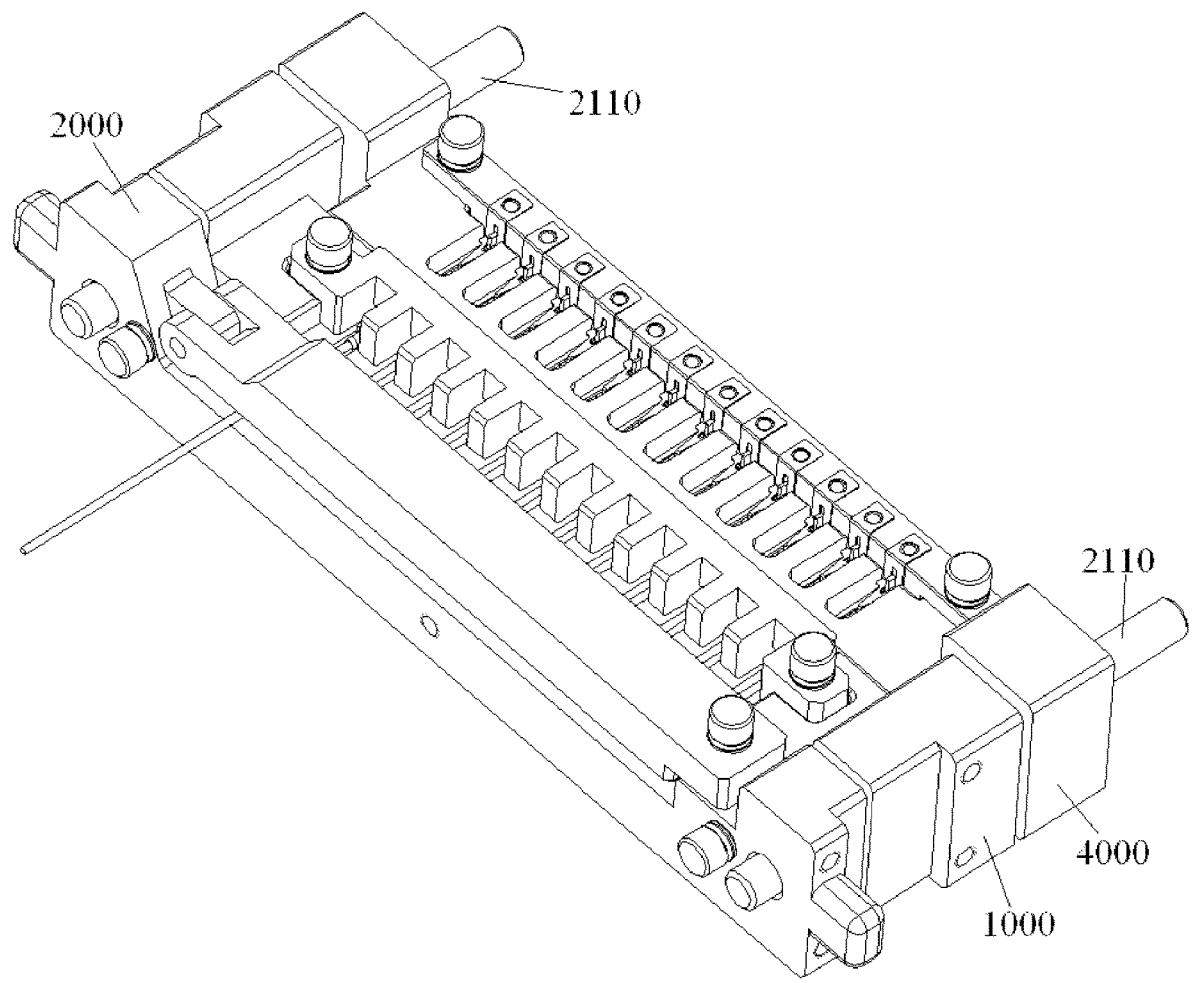
FIG. 19b shows the fiber alignment module, the fiber/cable clamping module and the ferrule clamping module of FIG. 19a, in which the fiber alignment module is engaged to the ferrule clamping module, and the front end of the respective ferrule assembly clamped by the ferrule clamping module is inserted into the respective alignment sleeve of the fiber alignment module.

FIG. 19*a* shows a fiber alignment module 4000, the fiber/cable clamping module 1000 and the ferrule clamping module 2000 of FIG. 12, in which the fiber alignment module 4000 is separated from the ferrule clamping module 2000; FIG. 19*b* shows the fiber alignment module 4000, the fiber/cable clamping module 1000 and the ferrule clamping module 2000 of FIG. 19*a*, in which the fiber alignment module 4000 is engaged to the ferrule clamping module 2000, and the front end of the respective ferrule assembly 100 clamped by the ferrule clamping module 2000 is inserted into the respective alignment sleeve 4300 of the fiber alignment module 4000.

As shown in FIGS. 19*a* and 19*b*, in an embodiment of the present invention, the fiber alignment module 4000 is adapted to be engaged to the front side of the ferrule clamping module 2000, and configured to calibrate position accuracy of the respective fiber 210 inserted into the fiber bore 121 of the respective ferrule assembly 100 and adjust an eccentricity orientation of the center O' of the respective fiber 210 to a predetermined orientation.

As shown in FIGS. 19*a* and 19*b*, in the illustrated embodiment, the fiber alignment module 4000 mainly comprises a seat body 4100 and a row of fiber alignment mechanisms (to be described later) mounted on the seat body 4100. The row of fiber alignment mechanisms corresponds to the row of ferrule assemblies 100 clamped on the ferrule clamping module 2000, so as to calibrate the position of the fiber 210 in the ferrule assembly 100 and adjust the eccentricity orientation of the fiber 210.

In an embodiment of the present invention, alignment holes 4110, for matching with the front alignment pins 2110 of the ferrule clamping module 2000, are formed in both ends of a seat body 4100. In this way, the fiber alignment module 4000 may be accurately and easily engaged to the ferrule clamping module 2000 simply by inserting the front alignment pin 2110 of the ferrule clamping module 2000 into the alignment hole 4110 of the fiber alignment module 4000. After the fiber alignment module 4000 is engaged to the ferrule clamping module 2000, the row of fiber alignment mechanisms are aligned to the row of ferrule assemblies 100 clamped on the ferrule clamping module 2000 one by one.

As described above, FIGS. 20a and 21b show the fiber alignment mechanism of the fiber alignment module 4000.

As shown in FIGS. 20a-21b, each of the fiber alignment mechanisms mainly comprises a fixation block 4500, a row of alignment elements 4400, a row of alignment sleeves 4300 and a row of spring elements 4200.

Referring to FIGS. 19a, 20a and 20b, the fixation block 4500 is mounted on the seat body 4100. Each of the alignment elements 4400 has a first end portion fixed in the fixation block 4500 and a second end portion formed with a protrudent platform 4420. An alignment groove 4410 extending to the end of the protrudent platform 4420 in a central axis of the alignment element 4400 is formed in each of alignment elements 4400.

The alignment sleeves 4300 are held in the seat body 4100, and each of the alignment sleeves 4300 has a first end portion fitted on the second end portion of the alignment element 4400 and a second end portion opposite to the first end portion. Each of the row of spring elements 4200 has a first end 4231 extending into the respective alignment sleeve 4300 and being pressed against the alignment groove 4410 in the protrudent platform 4420 in a direction perpendicular to the central axis of the alignment element 4400 (see FIG. 22).

As shown in FIGS. 21a and 21b, the fiber 210 protrudes from the front end of the ferrule assembly 100, and the front end of the ferrule assembly 100 is inserted into the alignment sleeve 4300 from the second end of the alignment sleeve 4300 until a predetermined length of the fiber 210 protruding from the front end of the ferrule assembly 100 enters into the alignment groove 4410 of the alignment element 4400. In this way, when the front end of the ferrule assembly 100 is inserted into the alignment sleeve 4300 and when the fiber 210 is inserted into the alignment groove 4410 of the alignment element 4400, the position accuracy of the fiber 210 in the fiber bore 121 of the ferrule assembly 100 is calibrated to reach position accuracy of the fiber 210 in the alignment groove 4410 of the alignment element 4400. Please be noted that, in this embodiment, the geometric center of the alignment groove 4410 is accurately positioned at an ideal center determined with reference to an inner circumferential surface of the alignment sleeve 4300, therefore, it ensures the calibrated center of the fiber 210 is accurately positioned at an ideal center determined with reference to an outer circumferential surface of the ferrule assembly 100. Herein, the term 'accurately positioned' means that an error between the actual center and the ideal center of the fiber is less than a predetermined value, for example, less than 0.0005 mm or even more less.

FIG. 22 is a principle view of adjusting an eccentricity orientation of the fiber by means of the fiber alignment module of FIG. 21b.

As shown in FIGS. 21b and 22, when the front end of the ferrule assembly 100 is inserted into the alignment sleeve 4300 and when the fiber 210 is inserted into the alignment groove 4410 of the alignment element 4400, the first end 4231 of the spring element 4200 is pressed against the fiber 210 inserted into the alignment groove 4410, so that an eccentricity orientation of a center O' of the fiber 210 with respect to a center O of the alignment element 4400 is adjusted to a predetermined orientation and held in the predetermined orientation.

As shown in FIGS. 21b and 22, the eccentricity orientation of the center O' of the fiber 210 with respect to the center O of the alignment element 4400 is adjusted to be just below the center O of the alignment element 4400.

In an exemplary embodiment of the present invention, after the center O' of the fiber 210 is adjusted to be just below the center O of the alignment element 4400, an eccentricity orientation mark is formed on an outer surface of the ferrule assembly 100 to identify the eccentricity orientation of the center O' of the fiber 210 with respect to the center O of the alignment element 4400. In an alternative embodiment, after the center O' of the fiber 210 is adjusted to be just below the center O of the alignment element 4400, an existing feature on the ferrule assembly 100 may be used as an eccentricity orientation mark to identify the eccentricity orientation of the center O' of the fiber 210 with respect to the center O of the alignment element 4400. In an exemplary embodiment of the present invention, the eccentricity orientation mark may be any mark, such as, notching mark, printing mark or any other visible mark, located on the ferrule 120 or the rear seat 110 of the ferrule assembly 100.

In another exemplary embodiment, as shown in FIG. 23, the injection hole 103 formed in the rear seat 110 may be served as the eccentricity orientation mark. In this way, it is unnecessary to individually form an eccentricity orientation mark on the ferrule assembly 100. Referring to FIG. 23 again, in the illustrated embodiment, when the injection hole 103 is used as the eccentricity orientation mark, it is possible to determine the correct orientation, for example, an orientation when the injection hole 103 is positioned vertically upward, of the ferrule assembly 100 with respect to a housing 300 of a fiber optic connector based on the injection hole 103. In the illustrated embodiment of FIG. 23, after the ferrule assembly 100 with the optical cable 200 is inserted into the connector housing 300 based on the correct orientation, other members, such as, a spring 400, a spring seat 500, etc., of the connector may be subsequently mounted in the connector housing 300, and the fiber optic connector is assembled. Please be noted that the present invention is not limited to this, the spring 400, the spring seat 500 and the ferrule assembly 100 may be pre-assembled together to form an integral member, and then they, as the integral member, may be mounted in the connector housing 300 at one time.

In an exemplary embodiment of the present invention, after the eccentricity orientation of the center O' of the fiber 210 with respect to the center O of the alignment element 4400 is adjusted to be just below the center O of the alignment element 4400, the fiber 210 is fixed in the though hole 121 of the ferrule assembly 100 by the cured adhesive 116. In this way, the position calibration and the eccentricity orientation adjustment of the fiber 210 are finished.

Referring to FIGS. 20a-22 again, in the illustrated embodiment, the spring element 4200 is configured to be a cantilever spring piece, and the second end 4210 of the spring element 4200 is connected to the fixation block 4500 by a screw 4211. A press force F exerted on the fiber 210 by the first end 4231 of the spring element 4200 is adjusted to adapt to different diameters of fibers by controlling a distance of screwing the screw 4211 into a threaded hole 4111 in the fixation block 4500.

Although it is not shown, in another embodiment of the present invention, the eccentricity orientation of the center O' of the fiber 210 with respect to the center O of the alignment element 4400 may be controlled by the adjusting the press force F. For example, it is possible to adjust the center O' of the fiber 210 to a position just above the center O of the alignment element 4400 or just overlapping with the center O of the alignment element 4400 by adjusting the press force F.

In an exemplary embodiment of the present invention, as shown in FIGS. 20-22, a positioning slot 4221 is formed in the spring element 4200, and a protruding positioning key 4121 is formed on the fixation block 4500. The positioning key 4121 is fitted in the positioning slot 4221 to hold the position of the spring element 4200, so as to keep the position of the spring element 4200 in a direction perpendicular to the central axis of the alignment element 4400 and the press force F (a direction perpendicular to the positioning slot 4221 shown in FIG. 20*a*) unchanged.

Referring to FIG. 20*a* again, in the illustrated embodiment, the spring element 4200 comprises a first sheet portion 4230 substantially parallel to the central axis of the alignment element 4400 and a second sheet portion 4220 substantially perpendicular to and integrally connected to the first sheet like portion 4230. The positioning slot 4221 is formed in both the first sheet portion 4230 and the second sheet portion 4220. In this embodiment, the positioning slot 4221 is formed to include two portions substantially perpendicular to and communicated with each other, improving the positioning reliability and precision of the positioning slot 4221.

Referring to FIG. 20*a* again, in the illustrated embodiment, a notch 4330 is formed in the alignment sleeve 4300, and the first end 4231 of the spring element 4200 enters into the alignment sleeve 4300 through the notch 4330.

According to another general concept of the present invention, there is provided a method for manufacturing a fiber optic ferrule device, comprising steps of: providing a plurality of ferrule assemblies and a plurality of optical cables, each of optical cables having a section of bared fiber at an end thereof; inserting the fibers into fiber bores of the respective ferrule assemblies until each of the fibers protrudes a predetermined distance from a front end surface of the respective ferrule assembly; providing the apparatus as mentioned in the above embodiments; engaging the ferrule clamping module and the fiber/cable clamping module together; clamping and fixing the ferrule assemblies provided with the fibers on the ferrule clamping module; clamping and fixing a section of each of optical cables behind the ferrule clamping module on the fiber/cable clamping module; injecting an adhesive into the fiber bores of the respective ferrule assemblies; engaging the vacuum suction module to the ferrule clamping module, and fitting vacuum suction nozzles of the vacuum suction module on the front ends of the respective ferrule assemblies to suck the adhesive, so that the adhesive flows to the front end surface of the respective ferrule assembly through a gap between the fiber and the fiber bore until a predetermined size of adhesive bump is formed on the front end surface of the respective ferrule assembly; removing the vacuum suction module from the ferrule clamping module; engaging the fiber alignment module to the ferrule clamping module, so that the front end of each of the ferrule assemblies is inserted into the respective alignment sleeve until a predetermined length of the fiber protruding from the front end of the ferrule assembly enters into the alignment groove of the alignment element; and curing the adhesive to fix the fibers in the fiber bores of the respective ferrule assemblies.

Hereafter, it will describe a method of manufacturing a fiber optic ferrule device with reference to FIGS. 4*a*, 4*b*, 8-21 according to an exemplary embodiment of the present invention, and the method mainly comprises following steps of:

S300: providing a plurality of ferrule assemblies 100 (for example, the ferrule assembly 100 shown in FIGS. 4*a* and 4*b* or FIGS. 2*a*-3*b*, 5*a*-7*b*) and a plurality of optical cables 200, each of optical cables 200 having a section of bared fiber 210 at an end thereof, and each of the ferrule assemblies 100 is not filled with adhesive;

S301: as shown in FIG. 9*a*, inserting the fibers 210 into fiber bores 121 of the respective ferrule assemblies 100 until each of the fibers 210 protrudes a predetermined distance from a front end surface of the respective ferrule assembly 100;

S302: as shown in FIG. 12, providing the apparatus for manufacturing the fiber optic ferrule device set forth in the above embodiments;

S303: as shown in FIG. 14, engaging the ferrule clamping module 2000 and the fiber/cable clamping module 1000 together;

S304: as shown in FIGS. 15*a* and 15*b*, clamping and holding the ferrule assemblies 100 provided with the fibers 210 on the ferrule clamping module 2000;

S305: as shown in FIG. 15*c*, clamping and holding a section of each of optical cables 200 behind the ferrule clamping module 2000 on the fiber/cable clamping module 1000;

S306: as shown in FIG. 9*b*, injecting an adhesive 116 into the fiber bores 121 of the respective ferrule assemblies 100;

S307: as shown in FIGS. 8, 9*c*, 18*a* and 18*b*, engaging the vacuum suction module 3000 to the ferrule clamping module 2000, and fitting vacuum suction nozzles 3200 of the vacuum suction module 3000 on the front ends of the respective ferrule assemblies 100 to suck the adhesive 116, so that the adhesive 116 flows to the front end surface of the respective ferrule assembly 100 through a gap between the fiber 210 and the fiber bore 121 until a predetermined size of adhesive bump 116*a* is formed on the front end surface of the respective ferrule assembly 100, as shown in FIG. 9*d*;

S308: removing the vacuum suction module 3000 from the ferrule clamping module 2000;

S309: as shown in FIGS. 19*a*, 19*b*, 20-21, engaging the fiber alignment module 4000 to the ferrule clamping module 2000, so that the front end of each of the ferrule assemblies 100 is inserted into the respective alignment sleeve 4300 until a predetermined length of the fiber 210 protruding from the front end of the ferrule assembly 100 enters into the alignment groove 4410 of the alignment element 4400; and S310: curing the adhesive 116 to fix the fibers 210 in the fiber bores 121 of the respective ferrule assemblies 100.

Please be noted that the present invention is not limited to this, the step S306 may be performed after inserting the plurality of fibers 210 into the fiber bores 121 of the plurality of ferrule assemblies 100 and before engaging the vacuum suction module 3000 to the ferrule clamping module 2000. That is, it may not be necessary to perform the step S306 after clamping and fixing the plurality of optical cables 200 on the fiber/cable clamping module 1000. For example, in another embodiment of the present invention, the method of manufacturing a fiber optic ferrule device may comprise following steps of:

S400: providing a plurality of ferrule assemblies 100 (for example, the ferrule assembly 100 shown in FIGS. 4*a* and 4*b* or FIGS. 2*a*-3*b*, 5*a*-7*b*) and a plurality of optical cables 200, each of optical cables 200 having a section of bared fiber 210 at an end thereof, and each of the ferrule assemblies 100 is not filled with the adhesive;

S401: as shown in FIG. 9*a*, inserting the fibers 210 into fiber bores 121 of the respective ferrule assemblies 100 until each of the fibers 210 protrudes a predetermined distance from a front end surface of the respective ferrule assembly 100;

S402: as shown in FIG. 12, providing the above described apparatus for manufacturing the fiber optic ferrule device;

S403: as shown in FIG. 14, engaging the ferrule clamping module 2000 and the fiber/cable clamping module 1000 together;

S404: as shown in FIGS. 15a and 15b, clamping and holding the ferrule assemblies 100 provided with the fibers 210 on the ferrule clamping module 2000;

S405: as shown in FIG. 9b, injecting an adhesive 116 into the fiber bores 121 of the respective ferrule assemblies 100;

S406: as shown in FIG. 15c, clamping and fixing a section of each of optical cables 200 behind the ferrule clamping module 2000 on the fiber/cable clamping module 1000;

S407: as shown in FIGS. 8, 9c, 18a and 18b, engaging the vacuum suction module 3000 with the ferrule clamping module 2000, and fitting vacuum suction nozzles 3200 of the vacuum suction module 3000 on the front ends of the respective ferrule assemblies 100 to suck the adhesive 116, so that the adhesive 116 flows to the front end surface of the respective ferrule assembly 100 through a gap between the fiber 210 and the fiber bore 121 until a predetermined size of adhesive bump 116a is formed on the front end surface of the respective ferrule assembly 100, as shown in FIG. 9d;

S408: removing the vacuum suction module 3000 from the ferrule clamping module 2000;

S409: as shown in FIGS. 19a, 19b, 20a-21b, engaging the fiber alignment module 4000 with the ferrule clamping module 2000, so that the front end of each of the ferrule assemblies 100 is inserted into the respective alignment sleeve 4300 until a predetermined length of the fiber 210 protruding from the front end of the ferrule assembly 100 enters into the alignment groove 4410 of the alignment element 4400; and S410: curing the adhesive 116 to fix the fibers 210 in the fiber bores 121 of the respective ferrule assemblies 100.

In the illustrated embodiments, although only a single-mode single-fiber ferrule assembly is shown and described, the present invention is not limited to this. The above embodiments of the present invention are also adapted to a single-mode multi-fiber ferrule assembly, a multi-mode single-fiber ferrule assembly, a multi-mode multi-fiber ferrule assembly or other type of ferrule device. With the solutions of the present invention, a fiber optic connector with high precision and low insertion loss may be produced by a low precision ferrule (a fiber bore of the low precision ferrule has a diameter far larger than that of a fiber bore of a high precision ferrule, and an eccentricity of the center of the fiber bore of the low precision ferrule with respect to a positioning reference is far larger than that of the center of the fiber bore of the high precision ferrule with respect to a positioning reference).

Please be noted that the finished ferrule assembly is also referred as the fiber optic ferrule device or the ferrule device herein, in order to differentiate the finished ferrule assembly from the unfinished ferrule assembly.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A fiber alignment device for calibrating position accuracy of a fiber in a fiber bore of a ferrule assembly, the fiber bore being defined by an inner circumferential surface of a ferrule of the ferrule assembly, comprising:
   a fixation block;
   an alignment element having a first end portion fixed in the fixation block and a second end portion formed with a protrudent platform, an alignment groove being formed in the alignment element and extending to an end of the protrudent platform in a central axis of the alignment element;
   an alignment sleeve having a first end portion fitted on the second end portion of the alignment element and a second end portion opposite to the first end portion; and
   a spring element having a first end extending into the alignment sleeve and pressed against the alignment groove in the protrudent platform in a direction perpendicular to the central axis of the alignment element,
   wherein the fiber protrudes from the front end of the ferrule assembly, and the front end of the ferrule assembly is inserted into the alignment sleeve from the second end portion of the alignment sleeve until a predetermined length of the fiber protruding from the front end of the ferrule assembly enters into the alignment groove of the alignment element,
   wherein when the front end of the ferrule assembly is inserted into the alignment sleeve and when the fiber is inserted into the alignment groove of the alignment element, the position accuracy of the fiber in the fiber bore of the ferrule is calibrated to reach position accuracy of the fiber in the alignment groove of the alignment element, and
   wherein the first end of the spring element is configured to be pressed against a portion of the fiber inserted into the alignment groove and protruding beyond the front end of the ferrule assembly, so that an orientation of a center of the fiber with respect to a center of the fiber bore is adjusted to a predetermined eccentric orientation and held in the predetermined eccentric orientation and such that there is a gap between the fiber and the inner circumferential surface of the ferrule completely surrounding the fiber at the front end of the ferrule.

2. The fiber alignment device according to claim 1, wherein
   the eccentricity orientation of the center of the fiber with respect to the center of the alignment element is adjusted to be just below the center of the alignment element.

3. The fiber alignment device according to claim 2, wherein after the eccentricity orientation of the center of the fiber with respect to the center of the alignment element is adjusted to be just below the center of the alignment element, the fiber is fixed in the fiber bore by an adhesive.

4. The fiber alignment device according to claim 3, wherein
an eccentricity orientation mark is formed on an outer surface of the ferrule assembly to identify the eccentricity orientation of the center of the fiber with respect to the center of the alignment element; or
an existing feature on the ferrule assembly is used as an eccentricity orientation mark to identify the eccentricity orientation of the center of the fiber with respect to the center of the alignment element.

5. The fiber alignment device according to claim 4, wherein
the eccentricity orientation mark is located on the ferrule or on a rear seat of the ferrule assembly.

6. The fiber alignment device according to claim 5, wherein
an injection hole, for injecting the adhesive into the ferrule assembly, formed in an external profile surface of the ferrule assembly is used as the eccentricity orientation mark.

7. The fiber alignment device according to claim 1, wherein
the spring element is configured to be a cantilever spring piece, and the second end of the spring element is connected to the fixation block by a screw; and
a press force exerted on the fiber by the first end of the spring element is adjusted by controlling a distance of screwing the screw into a threaded hole in the fixation block, to adapt to different diameters of fibers.

8. The fiber alignment device according to claim 7, wherein
a positioning slot is formed in the spring element, and a protruding positioning key is formed on the fixation block;
the positioning key is fitted in the positioning slot to position the spring element, to keep the position of the spring element in a direction perpendicular to the central axis of the alignment element and the press force unchanged.

9. The fiber alignment device according to claim 8, wherein
the spring element comprises a first sheet portion substantially parallel to the central axis of the alignment element and a second sheet portion substantially perpendicular to and intersected to the first sheet portion; and
the positioning slot is formed in both the first sheet portion and the second sheet portion.

10. The fiber alignment device according to claim 9, wherein
a notch is formed in the alignment sleeve, and the first end of the spring element enters into the alignment sleeve through the notch.

11. A method of calibrating position accuracy of a fiber in a fiber bore of a ferrule, the fiber bore being defined by an inner circumferential surface of the ferrule, a portion of the fiber protruding beyond an end face of the ferrule, the method comprising:
introducing an adhesive into the fiber bore;
pressing with a press force an end of a spring element against the portion of the fiber protruding beyond the end face of the ferrule, wherein the press force is perpendicular to a central axis of the fiber bore, and wherein the press force is selected such that a position of a center of the fiber within the fiber bore is adjusted to a predetermined eccentric orientation relative to a center of the fiber bore; and
subsequent to the pressing, curing the adhesive to fix the fiber in the fiber bore in the predetermined eccentric orientation relative to the center of the fiber bore and such that there is a gap between the fiber and the inner circumferential surface of the ferrule completely surrounding the fiber at the end face of the ferrule.

12. The method according to claim 11, wherein the ferrule is part of a ferrule assembly that comprises a single-mode single-fiber ferrule assembly, a single-mode multi-fiber ferrule assembly, a multi-mode single-fiber ferrule assembly, or a multi-mode multi-fiber ferrule assembly.

13. The method according to claim 12, wherein the ferrule assembly comprises the ferrule, a rear seat, and the fiber bore, and wherein the ferrule assembly includes an injection hole for injecting adhesive into the ferrule assembly.

14. The method according to claim 13, wherein the introducing an adhesive comprises injecting the adhesive through the injection hole.

15. The method according to claim 11, wherein the introducing an adhesive is performed before the pressing.

16. The method according to 11, wherein the introducing an adhesive is performed after the pressing.

17. A method of calibrating position accuracy of a fiber in a fiber bore of a ferrule, the fiber bore being defined by an inner circumferential surface of the ferrule, a portion of the fiber protruding beyond an end face of the ferrule, the method comprising:
introducing an adhesive into the fiber bore;
holding the portion of the fiber protruding beyond the end face of the ferrule such that a position of a center of the fiber within the fiber bore is held at a predetermined eccentric orientation relative to a center of the fiber bore; and
subsequent to the pressing, curing the adhesive to fix the fiber in the fiber bore in the predetermined eccentric orientation relative to the center of the fiber bore and such that there is a gap between the fiber and the inner circumferential surface of the ferrule completely surrounding the fiber at the end face of the ferrule.

18. The method according to claim 17, further comprising pressing with a press force an end of a spring element against the portion of the fiber protruding beyond the end face of the ferrule, wherein the press force is perpendicular to a central axis of the fiber bore.

19. The method according to claim 17, wherein the ferrule is part of a ferrule assembly that comprises a single-mode single-fiber ferrule assembly, a single-mode multi-fiber ferrule assembly, a multi-mode single-fiber ferrule assembly, or a multi-mode multi-fiber ferrule assembly, wherein the ferrule assembly comprises the ferrule, a rear seat, and the fiber bore, wherein the ferrule assembly includes an injection hole for injecting adhesive into the ferrule assembly, and wherein the introducing an adhesive comprises injecting the adhesive through the injection hole.

20. The method according to claim 17, wherein the introducing an adhesive is performed before the holding.

21. The method according to 17, wherein the introducing an adhesive is performed after the holding.

* * * * *

UNITED STATES PATENT AND TRADEMARK OFFICE
CERTIFICATE OF CORRECTION

PATENT NO. : 10,768,378 B2
APPLICATION NO. : 15/323498
DATED : September 8, 2020
INVENTOR(S) : Zhaoyang Tong et al.

Page 1 of 1

It is certified that error appears in the above-identified patent and that said Letters Patent is hereby corrected as shown below:

In the Claims

Column 34, Line 27, Claim 16: "according to 11," should read --according to claim 11,--

Column 34, Line 64, Claim 21: "according to 17," should read --according to claim 17,--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*